United States Patent
Oizumi

(10) Patent No.: US 8,446,989 B2
(45) Date of Patent: May 21, 2013

(54) SIGNAL SEPARATING DEVICE AND SIGNAL SEPARATING METHOD

(75) Inventor: Toru Oizumi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/490,220

(22) Filed: Jun. 6, 2012

(65) Prior Publication Data

US 2012/0236972 A1    Sep. 20, 2012

Related U.S. Application Data

(63) Continuation of application No. 12/377,948, filed as application No. PCT/JP2007/066153 on Aug. 21, 2007, now Pat. No. 8,223,895.

(30) Foreign Application Priority Data

Aug. 22, 2006   (JP) ................... 2006-225933

(51) Int. Cl.
*H04L 27/00*   (2006.01)

(52) U.S. Cl.
USPC ........... 375/341; 375/316; 375/259; 375/260; 375/261; 375/262; 375/267

(58) Field of Classification Search
USPC ................ 375/316, 341, 259, 260, 261, 262, 375/267
See application file for complete search history.

(56) References Cited

U.S. PATENT DOCUMENTS

| 7,936,838 B2 | 5/2011 | Ito et al. |
|---|---|---|
| 2003/0053566 A1 | 3/2003 | He et al. |
| 2005/0008091 A1 | 1/2005 | Boutros et al. |
| 2005/0210039 A1 | 9/2005 | Garrett |
| 2008/0095257 A1 | 4/2008 | Maeda et al. |
| 2008/0232500 A1 | 9/2008 | Oh et al. |

FOREIGN PATENT DOCUMENTS

| JP | 2004-522375 A | 7/2004 |
|---|---|---|
| JP | 2005-354678 A | 12/2005 |
| JP | 2006-157390 A | 6/2006 |
| WO | 03/007529 A1 | 1/2003 |

OTHER PUBLICATIONS

English Language Abstract of JP 2004-522375, dated Jul. 22, 2004.
English Language Abstract of JP 2005-354678, dated Dec. 22, 2005.
English Language Abstract of JP 2006-157390, dated Jun. 15, 2006.
Higashinaka et al., "Reduced Complexity Maximum Likelihood Detection with Soft-Decision Outputs for MIMO Wireless Communication Systems," The Institute of Electronics, Information and Communication Engineers, IEICE Technical Report, RCS2005-90, Oct. 13, 2005, pp. 37-42.

(Continued)

*Primary Examiner* — Siu Lee
(74) *Attorney, Agent, or Firm* — Seed IP Law Group PLLC

(57) ABSTRACT

A signal demultiplexing method and apparatus are provided, for determining a likelihood of each bit included in a second signal, which is spatially multiplexed with and received with a first signal, based on a maximum likelihood detection (MLD) method using QR decomposition, wherein the first signal excludes the second signal to be calculated only in a final stage of the MLD method.

4 Claims, 18 Drawing Sheets

OTHER PUBLICATIONS

Higuchi et al., "Likelihood function for QRM-MLD suitable for soft-decision turbo decoding and its performance for OFCDM MIMO multiplexing in multipath fading channel," in: Personal, Indoor and Mobile Radio Communication, 2004, PIMRC 2004, 15th IEEE International Symposium on, vol. 2, Sep. 8, 2004, on pp. 1142-1148.

Ito et al., "A Study on LLR Complementing Method for Incomputable LLR in QRM-MLD-based MIMO Systems," The Institute of Electronics, Information and Communication Engineers, Sep. 7, 2005, p. 414.

Itoh et al., "Comparison of Complexity-reduced Maximum Likelihood Detection Based on Symbol Replica-Candidate Selection with QR Decomposition on Throughput and Computational Complexity in OFCDM MIMO Multiplexing," The Institute of Electronics, Information and Communication Engineers, IEICE Technical Report, RCS2003-313, Mar. 2004, pp. 61-66.

Kawai et al., "Adaptive Control of surviving symbol replica candidates in QRM-MLD for OFDM MIMO multiplexing," in: Selected Areas in Communications, IEEE Journal on Jun. 2006.

Murakami et al., "Likelihood Detection Utilizing Ordering and Decision of Partial Bits in MIMO Spatial Multiplexing Systems," The Institute of Electronics, Information and Communication Engineers, IEICE Technical Report, RCS2005-90, Oct. 12, 2005, pp. 31-36.

Seki et al., "Likelihood Function for Complexity-reduced Maximum Likelihood Detection Based on System Replica-Candidate Selection with QR Decomposition Suitable to Soft-Decision Turbo Decoding in OFCDM MIMO Multiplexing," Technical Report of IEICE, WBS2003-98, A P2003-291, RCS2003-314, MoMuC2003-104, MW2003-260 (Mar. 2004), pp. 67-72.

SIGNAL SEPARATING DEVICE AND SIGNAL SEPARATING METHOD

BACKGROUND

1. Technical Field

The present invention relates to a signal demultiplexing apparatus and signal demultiplexing method. More particularly, the present invention relates to a signal demultiplexing apparatus and signal demultiplexing method used in a radio receiving apparatus of the MIMO (Multi-Input Multi-Output) scheme.

2. Description of the Related Art

Patent Document 1 discloses a receiver that carries out signal demultiplexing according to a conventional QRM-MLD method (maximum likelihood detection (MLD) method using QR decomposition and M algorithm). As shown in FIG. 1, the receiver disclosed in Patent Document 1 has: a plurality of receiving antennas 10-1, 10-2, 10-3 and 10-4; channel estimation section 20; ranking section 30; rearranging section 40; QR decomposition section 50; signal converting section 60; maximum likelihood deciding section 70; and likelihood outputting section 80. Maximum likelihood deciding section 70 has four deciding sections 72-1, 72-2, 72-3 and 72-4. The number of deciding sections is determined according to the number of transmission signals. The deciding sections have similar processing blocks, and so fourth deciding section 72-4 will be described as a representative of these deciding sections. The deciding section has symbol replica generating section 74-4, square Euclidean distance calculating section 76-4 and surviving symbol candidate selecting section 78-4. Here, assume that signals $x = (x1 \ldots x4)^T$ are each transmitted from four transmitting antennas by 16 QAM modulation scheme where the superscript letter symbol T stands for the transpose. Signals x are referred to as "transmission signal vectors" and form one symbol. x1, x2, x3 and x4 are referred to as "transmission signals" or "vector components."

Channel estimation section 20 finds a channel impulse response value (CIR) or channel estimation value based on received signals including the pilot signal known both on the transmitting side and receiving side. Matrix H using channel estimation value hnm as a matrix element, is referred to as a "channel matrix." Note that hnm represents the channel estimation value between the m-th transmitting antenna and n-th receiving antenna.

Ranking section 30 rates or ranks a plurality of received signals y1 ... y4 in order of the magnitude of power.

Rearranging section 40 reports the order a plurality of received signals are arranged, to QR decomposition section 50 and signal converting section 60.

QR decomposition section 50 finds matrices Q and R such that channel matrix H determined in channel estimation section 20 is represented as a product of unitary matrix Q and upper triangular matrix R (H=QR). Unitary matrix Q in this case satisfies $Q^H Q = Q Q^H = I$, and may be a square matrix or include different numbers of rows and columns. The superscript letter H represents the conjugate transpose and I represents the unit matrix.

Signal converting section 60 carries out signal conversion by multiplying received signal vectors $y = (y1, \ldots, y4)^T$ by conjugate transpose matrix $Q^H$ of unitary matrix Q. y=Hx=QRx holds between transmission signals and received signals. When $Q^H$ is multiplied upon this equation from the left, $Q^H y = z$ holds in the left side and $Q^H QRx = Rx$ holds in the right side, so that the relationship between transmission signals and received signals can be represented by, for example, z=Rx. However, $z = (z1 \ldots z4)^T = Q^H y$ holds. z is referred to as "received signal vectors after unitary conversion."

Elements of received vector z can be represented as z1=r11x1+r12x2+r13x3+r14x4, z2=r22x2+r23x3+r24x4, z3=r33x3+r34x4 and z4=r44x4.

Maximum likelihood deciding section 70 narrows down candidates for a transmission signal (also referred to as "symbol candidates"), that is, decreases the number of candidates, by the maximum likelihood deciding method (MLD method). Symbol replica generating section 74-4 of deciding section 72-4 generates candidates of a transmission signal associated with received signal y4, using the matrix elements of upper triangular matrix R. The number of candidates is c, for example, and is set fixedly.

Square Euclidean distance calculating section 76-4 calculates square Euclidean distances between converted received signal z4 and C signal point candidates. The square Euclidean distances represent the metric used as the base of likelihood calculation. Candidates of shorter square Euclidean distances are decided to be closer to the transmitted symbol.

Surviving symbol candidate selecting section 78-4 outputs S1(≦C) candidates as surviving candidates based on the square Euclidean distances with respect to the candidates.

Likelihood outputting section 80 calculates the likelihoods or reliabilities of the candidates outputted from the surviving symbol candidate selecting section in the final stage. To be more specific, these likelihoods are represented by log likelihood ratios (LLR's). Outputs from likelihood outputting section 80 represent signal demultiplexing results and are transmitted to a subsequent demodulating section (for example, turbo decoder).

The operation will be described next. The receiver receives transmission signals as received signals y1 to y4 at four receiving antennas. These received signals are delivered to channel estimation section 20 and signal converting section 60. The order a plurality of received signals are arranged, is determined by channel estimation section 20, ranking section 30 and rearranging section 40. Here, the received signals are aligned in order of the magnitude of received power and, for ease of description, assume that received power increases in order from x1, x2, x3 and x4. Signal converting section 60 carries out unitary conversion of the received signals as in $z = (z1 \ldots z4)^T = Q^H y$ and inputs the converted signals to maximum likelihood deciding section 70.

In the first stage in maximum likelihood deciding section 70, processing corresponding to default setting is carried out in deciding section 72-4. In this stage, the equation related to above z4 is focused upon. Matrix element r44 is known, and z4 does not interfere with other signals and relies on only one transmission signal x4. In this way, there are sixteen patterns of signal point candidates of transmission signal x4 at maximum. Symbol candidate generating section 74-4 generates sixteen signal point candidates (C=16) of x4. In other words, sixteen signal points on the signal constellation are selected. The square Euclidean distances between these candidates and converted fourth received signal z4 are calculated in square Euclidean distance calculating section 76-4, and S1 candidates are selected as surviving candidates in order from the shortest distance.

The second stage is performed in deciding section 72-3. Here, the equation related to z3 is focused upon. Matrix elements r33 and r34 are known, and there are sixteen patterns of signal candidates of x4 and sixteen patterns of signal candidates of x3. Sixteen signal points are introduced by symbol generating section 74-3 as additional signal points for x3. Consequently, there may be 16×16=256 patterns of combinations of signal points (that is, 256 candidates). The 256 patterns of square Euclidean distances between these candidates and third received signal x3 are calculated, and the candidates are narrowed down by selecting sixteen (S2=16) combinations in order from the smallest value.

Similar processing is carried out by deciding section 72-2 for the third stage. In this stage, the equation related to z2 is focused upon. Matrix elements r22, r23 and r24 are known and combinations of transmission signals x3 and x4 are narrowed down to sixteen patterns of candidates in the previous stage, and there are sixteen patterns of signal point candidates of x2. Consequently, symbol candidate generating section 74-2 generates sixteen candidates of x2. By selecting sixteen (S3=16) candidates of shorter square Euclidean distances from 256 patterns of combinations of signal points in this case, the candidates are narrowed down.

Similar processing is carried out by deciding section 72-1 for the fourth stage (here, the final stage). In this stage, the equation related to z1 is focused upon. Matrix elements r11, r12, r13 and r14 are known and combinations of transmission signals x2, x3 and x4 are narrowed down to sixteen patterns of candidates in the previous stage, and so there are sixteen signal point candidates of x1. Consequently, symbol candidate generating section 74-1 generates sixteen candidates related to x1. By selecting sixteen patterns of candidates (S4=16) of shorter square Euclidean distances from 256 patterns of combinations of signal points in this case, the candidates are narrowed down.

By limiting the number of candidates to equal to or less than a certain number (for example, S1≦C) in each stage in this way, signal point candidates of transmission signals can be narrowed down without calculating the square Euclidean distances for all possible combinations of signal points.
Patent Document 1: Japanese Patent Application Laid-Open No. 2006-157390

BRIEF SUMMARY

Problems to be Solved by the Invention

However, the amount of operation is great in the above conventional signal demultiplexing method, and further reduction in the amount of operation is desired. Even if symbol candidates are simply reduced, although the amount of operation is reduced, there is a possibility that there is no bit likelihood. In this case, precision of subsequent demodulation decreases and there is a possibility that communication quality deteriorates. Further, particularly if the number of transmitting antennas is little and the M-ary modulation value is great, the amount of operation in the final stage becomes a problem. For example, in case of 2×2 MIMO, 64 QAM and QRM-MLD, if the number of selected symbol candidates in stage 1 is N, the count of calculating the square Euclidean distances in stage 1 is 64 times and N×64 times in stage 2.

In view of the above, it is therefore an object of the present invention to provide a signal demultiplexing apparatus and signal demultiplexing method for reducing the amount of operation and improving communication quality by lowering the probability that there is no bit likelihood.

Means for Solving the Problem

The signal demultiplexing apparatus according to the present invention is used in a radio receiving apparatus adopting a multi-input and multi-output scheme and that carries out signal demultiplexing by a maximum likelihood detection scheme using QR decomposition, employs a configuration including: a detecting section that detects, for every remaining combination of signal point candidates determined by one stage before a final stage, a closest neighboring signal point that is on a constellation used in the final stage and that is shortest separated distance from signal points defined when the every combination is fixed; a selecting section that selects the signal points on the constellation which are associated with the closest neighboring signal point and a number of which is a natural number equal to or less than an M-ary modulation value of a received signal; and a distance calculating section that calculates measures showing Euclidean distances between a received signal point in the final stage after unitary conversion, and the closest neighboring signal point and the selected signal points.

The signal demultiplexing method according to the present invention that is used in a radio receiving apparatus adopting a multi-input and multi-output scheme and that carries out signal demultiplexing by a maximum likelihood detection scheme using QR decomposition, includes: detecting, for every remaining combination of signal point candidates determined by one stage before a final stage, a closest neighboring signal point that is on a constellation used in the final stage and that is shortest separated distance from signal points defined when the every combination is fixed; selecting the signal points on the constellation which are associated with the closest neighboring signal point and a number of which is a natural number equal to or less than an M-ary modulation value of a received signal; and calculating measures showing Euclidean distances between a received signal point in the final stage after unitary conversion, and the closest neighboring signal point and the selected signal points.

Advantageous Effect of the Invention

According to the present invention, it is possible to provide a signal demultiplexing apparatus and signal demultiplexing method for enabling reduction in the amount of operation and improvement in communication quality.

DETAILED DESCRIPTION

Figure 1:
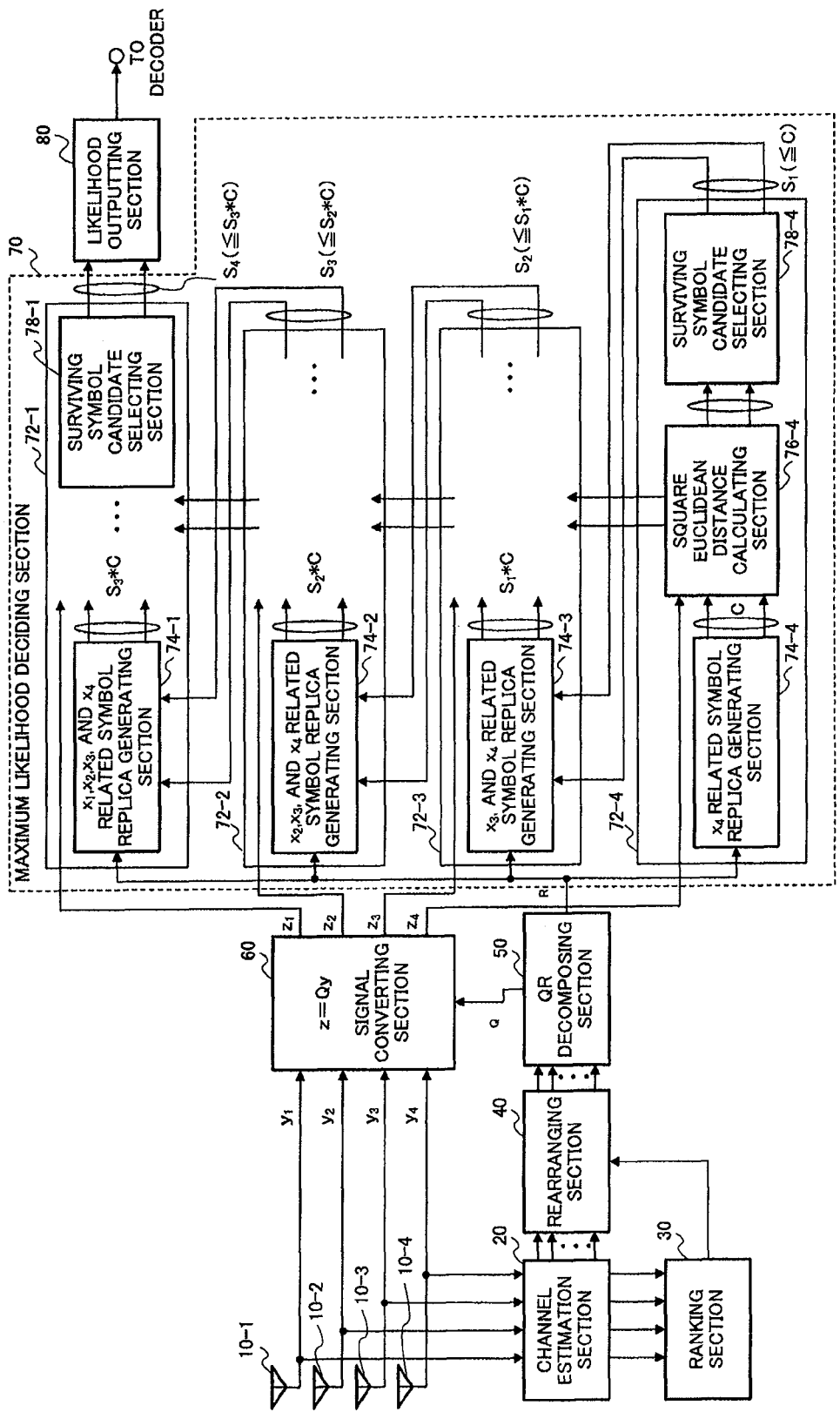
FIG. 1 is a block diagram showing a configuration of a receiver that carries out signal demultiplexing according to a conventional QRM-MLD method.

Hereinafter, embodiments of the present invention will be described in detail with reference to the accompanying drawings. Further, in the embodiments, the same components will be assigned the same reference numerals and overlapping description thereof will be omitted.

Embodiment 1

Figure 2:
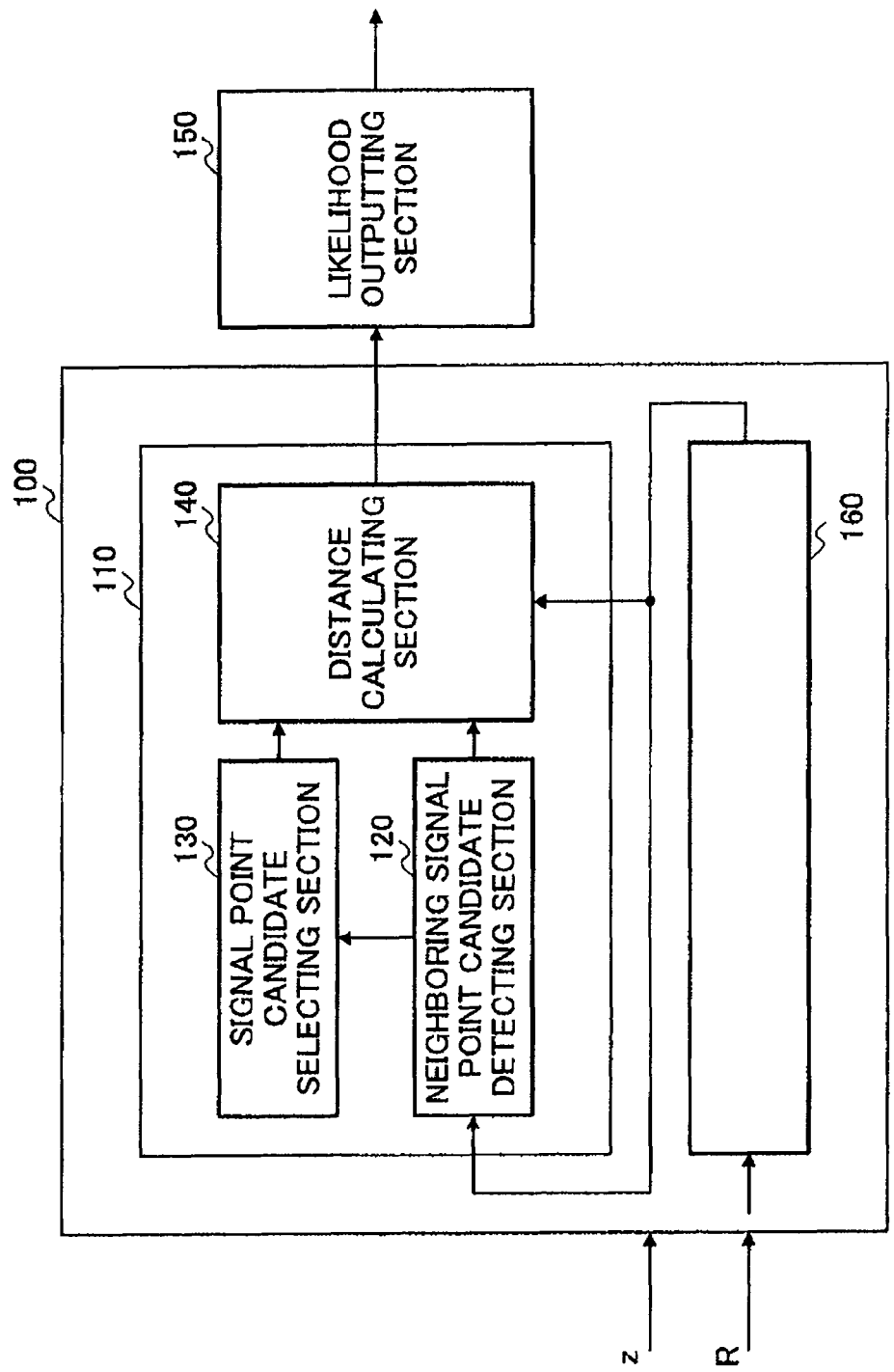
FIG. 2 is a block diagram showing a configuration of a maximum likelihood deciding section according to Embodiment 1 of the present invention.

As shown in FIG. 2, maximum likelihood deciding section 100 according to Embodiment 1 utilized in a signal demultiplexing apparatus mounted in a radio receiver has deciding section 110 that carries out processing in the final stage and deciding section 160 that carries out processings in preceding stages. Further, in the above signal demultiplexing apparatus, likelihood outputting section 150 that carries out likelihood selection and LLR calculation is provided in the output stage of maximum likelihood deciding section 100.

Further, deciding section 110 has neighboring signal point candidate detecting section 120, signal point candidate selecting section 130 and distance calculating section 140.

Similar to the maximum likelihood deciding section of the above conventional art, maximum likelihood deciding section 100 receives as input from a signal converting section received signal vectors z after unitary conversion and the matrix elements of upper triangular matrix R.

Deciding section 160 one stage before the final stage outputs (N patterns) of combinations of candidate points of transmission signals other than the transmission signal in which square Euclidean distances are calculated with respect to candidate points in the final stage.

Deciding section 110 in the final stage detects the closest neighboring signal point on the constellation to the signal point defined when symbol candidates are fixed, for (N patterns) of combinations of symbol candidates of transmission signals inputted from deciding section 160, and calculates square Euclidean distances between the received signal in the final stage, and this closest neighboring signal point and m signal points associated in advance with this closest neighboring signal point, and outputs these square Euclidean distances to likelihood outputting section 150.

To be more specific, neighboring signal point candidate detecting section 120 detects the closest neighboring signal point on the constellation to "the signal point defined when symbol candidates are fixed," for (N patterns) of combinations of symbol candidates of transmission signals inputted from deciding section 160.

Signal point candidate selecting section 130 outputs m signal points on the constellation associated with the closest neighboring signal point detected in neighboring signal point candidate detecting section 120, to distance calculating section 140. For example, signal point candidate selecting section 130 is formed with a memory that stores in advance signal points on the constellation used in the final stage and m signal points associated with the signal points. Here, the m signal points associated with the signal points on the constellation used in the final stage are the signal points in which the signal points on the constellation are inverted per bit and are the closest signal points. The number of candidate bits to be inverted equals the M-ary modulation value, and there may be a case where the same signal point is inverted a plurality of times, so that m is a natural number equal to or less than the M-ary modulation value of the transmission signal. Further, there may be case where a group of the closest neighboring signal point and signal points associated with the closest neighboring signal point, is referred to as a "signal point group" below.

Distance calculating section 140 calculates the square Euclidean distances between the received signal in the final stage after unitary conversion, and the closest neighboring signal point detected in neighboring signal point candidate detecting section 120 and m signal points from signal point candidate selecting section 130, that is, constituent signal points of a signal point group.

Likelihood outputting section 150 selects the likelihood of the transmission signal in the final stage, based on the square Euclidean distances calculated in distance calculating section 140. Each of N signal point groups includes signal points showing "1" or signal points showing "0" for all bits of the transmission signal in the final stage as constituent signal points. Therefore, likelihood outputting section 150 selects the signal point of the shortest square Euclidean distance in the constituent signal points in all signal point groups per bit value of each bit, and outputs this selected signal point and the likelihood of this selected signal point. Further, likelihood outputting section 150 carries out processing of likelihoods of transmission signals in stages before the final stage based on the square Euclidean distances calculated in distance calculating section 140, in the same manner as in the above selection in the final stage, and thereby selects the signal point of the shortest Euclidean distance in each class in which candidate signal points are classified per bit value of each focused bit, and outputs this selected signal point and the likelihood of this selected signal point. Furthermore, for each bit, LLR of each bit is calculated based on the likelihood of the bit value 0 and the likelihood of the bit value 1. By so doing, likelihood outputting section 150 selects the likelihood of the signal point of the shortest square Euclidean distance in all candidate signal points per bit value of each bit in each stage. The configuration and operation of likelihood outputting section 150 will be described later in detail.

Figure 3:
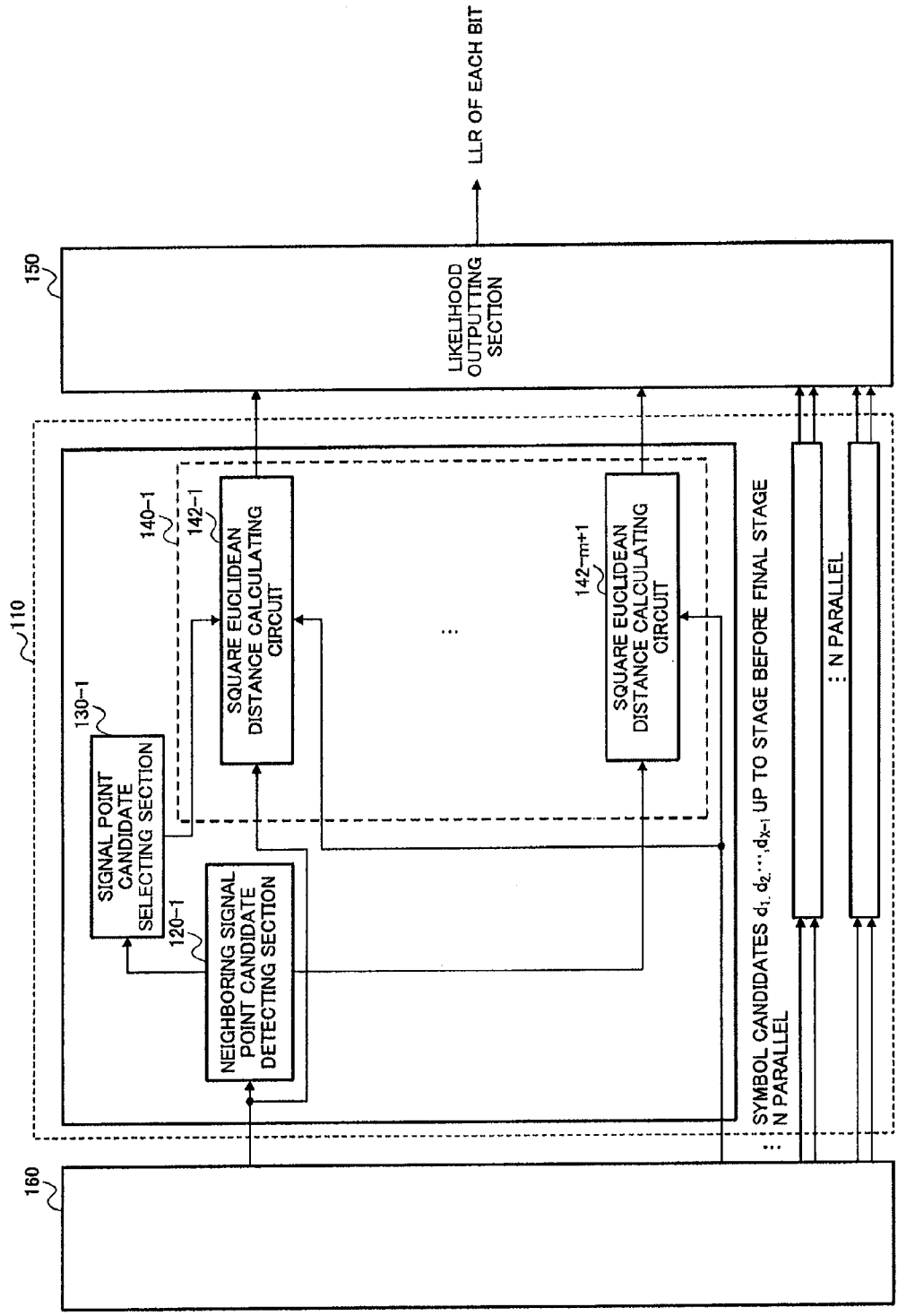
FIG. 3 shows a detailed configuration of a deciding section in the final stage of FIG. 2.

FIG. 3 shows the detailed configuration of deciding section 110 in the final stage of FIG. 2. As shown in FIG. 3, deciding section 110 has neighboring signal point candidate detecting sections 120-1 to N, signal point candidate selecting sections 130-1 to N and distance calculating sections 140-1 to N in parallel, for function sections for, for (N patterns) of combinations of received signals after unitary conversion from the stage before the last stage, detecting the closest neighboring signal point, outputting signal points associated with the closest neighboring signal point and calculating square Euclidean distances between the constituent signal points of each signal point group and the received signal in the final stage after unitary conversion. Further, distance calculating section 140 has square Euclidean distance calculating circuits 142-1 to m+1. Square Euclidean distance calculating circuits 142-1 to m calculate square Euclidean distances between the received signal point in the final stage and m signal points outputted from signal point candidate selecting section 130 and associated with the closest neighboring signal point. Square Euclidean distance calculating circuit 142-$m$+1 calculates the square Euclidean distance between the closest neighboring signal point detected in neighboring signal point candidate detecting section 120 and the received signal point in the final stage.

Figure 4:
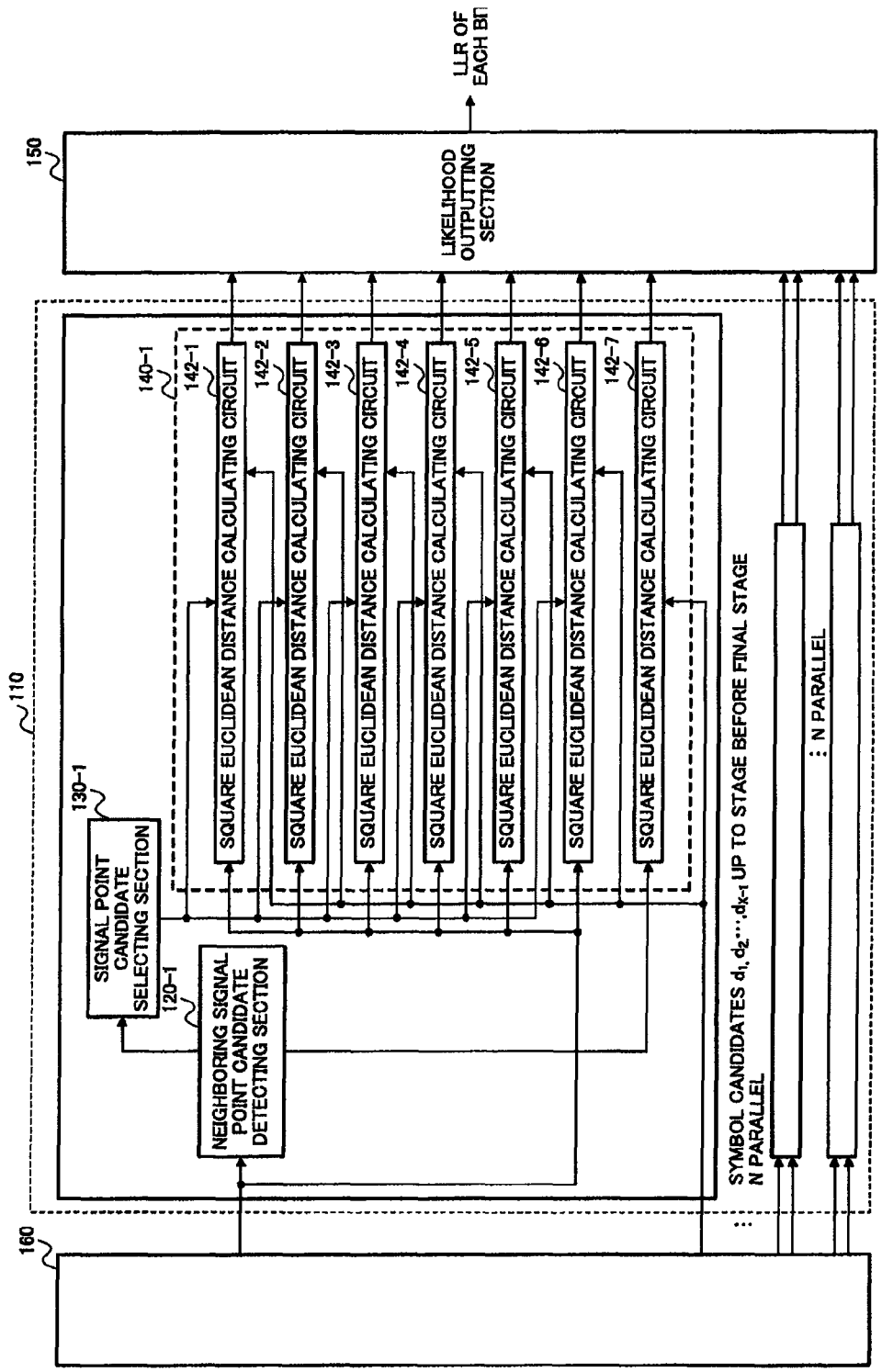
FIG. 4 shows a detailed configuration where an M-ary modulation value 6, that is, 64 QAM modulation scheme, is adopted in the deciding section of FIG. 3.

FIG. 4 shows a detailed configuration of deciding section 110 particularly when an M-ary modulation value 6, that is, 64 QAM modulation scheme, is adopted. As shown in FIG. 4, distance calculating section 140 has square Euclidean distance calculating circuits 142-1 to 7.

Figure 5:
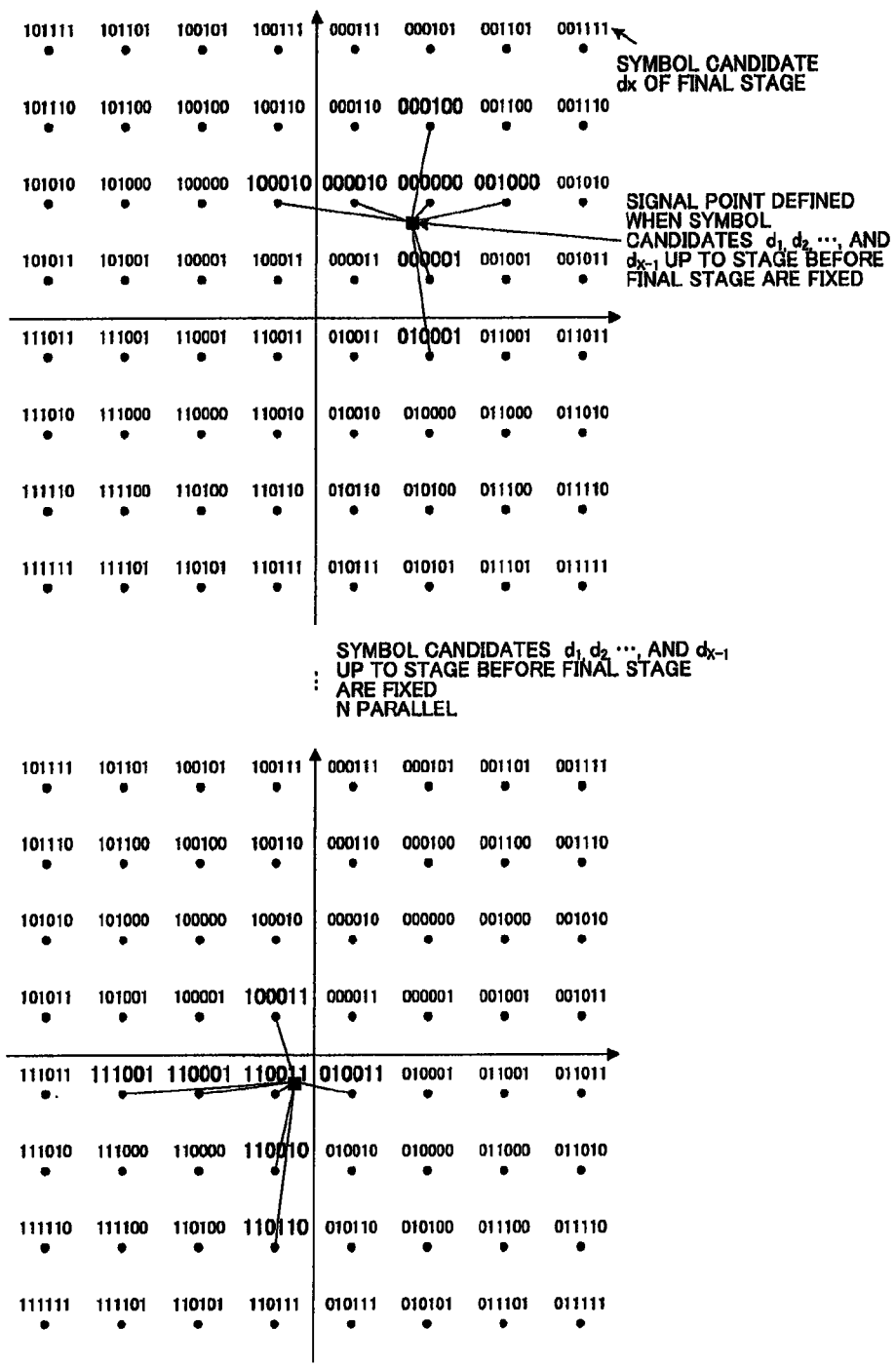
FIG. 5 illustrates an operation of the maximum likelihood deciding section of FIG. 2.

Next, the operation of maximum likelihood deciding section 100, particularly, the operations of neighboring signal point candidate detecting section 120, signal point candidate selecting section 130 and distance calculating section 140 in deciding section 110 when 64 QAM is adopted as the modulation scheme, will be described with reference to FIG. 5. Further, for ease of description, a case will be described where the number of antennas on the transmitting side is four and the number of antennas on the receiving side is four, that is, 4x4 MIMO communication is carried out.

Neighboring signal point candidate detecting section 120 receives as input from deciding section 160 combinations of candidate points of transmission signals up to the stage before the final stage.

Here, given that 4x4 MIMO is adopted, the relational equation used in the final stage (i.e., fourth stage) is above $z1=r11x1+r12x2+r13x3+r14x4$. (N patterns) of combinations of candidate signal points of x2, x3 and x4 are inputted to neighboring signal point candidate detecting section 120, to the stage before the final stage.

Neighboring signal point candidate detecting section 120 detects the closest neighboring signal point on the constellation to "the signal point defined when symbol candidates are fixed," for (N patterns) of combinations of symbol candidates of transmission signals. The result of inputting combinations of symbol candidates of transmission signals (that is, combinations of x2, x3 and x4) in $r12x2+r13x3+r14x4$, which is part of the above equation, is the symbol ■ on the constellation shown in FIG. 5, that is, "the signal point defined when symbol candidates are fixed." The signal point at the closest distance to this "signal point defined when symbol candidates are fixed" is detected in neighboring signal point candidate detecting section 120. This processing is carried out on a per combination basis. In the uppermost constellation of FIG. 5, "000000" is detected as the closest neighboring signal point.

Signal point candidate selecting section 130 stores in advance signal points on the constellation used in the final stage and m signal points associated with the signal points. Then, signal point candidate selecting section 130 outputs m signal points associated with the closest neighboring signal point detected per combination in neighboring signal point candidate detecting section 120, to distance calculating section 140.

Here, m signal points associated with the signal points on the constellation used in the final stage are signal points in which each bit of the signal points on the constellation is inverted and are the closest signal points. That is, when the closest neighboring signal point is "000000," "100010," which is the signal point closest to the closest neighboring signal point among signal points "1XXXXX" in which the first bit is inverted, is selected as a constituent signal point of the signal point group. Further, "010001," which is the signal point closest to the closest neighboring signal point among signal points "X1XXXX" in which the second bit is inverted, is selected as a constituent signal point of the signal point group. With 64 QAM, a constituent signal point is selected for each of six bits. Further, given that the present embodiment is described here assuming the gray encoded constellation, the number of constituent signal points equal to the number of bits is required in addition to the closest neighboring signal point. However, the present invention is not limited to this, and the constellation subjected to other encoding may be used. Depending on constellations, there may be a case where, for example, the signal point closest to the closest neighboring signal point among signal points in which each bit is inverted, is "111111." In this case, "111111" is the only constituent signal point of the signal point group. Consequently, signal point candidate selecting section 130 stores in advance the signal points on the constellation used in the final stage and m signal points which are associated with the signal points and the number of which is a natural number equal to or less than the M-ary modulation value of the transmission signal.

Distance calculating section 140 calculates square Euclidean distances between received signal z1 in the final stage after unitary conversion, and the closest neighboring signal point detected in neighboring signal point candidate detecting section 120 and m signal points from signal point candidate selecting section 130, that is, constituent signals of a signal group.

Next, the configuration and operation of likelihood outputting section 150 will be described with reference to FIG. 6 and FIG. 7.

Figure 6:
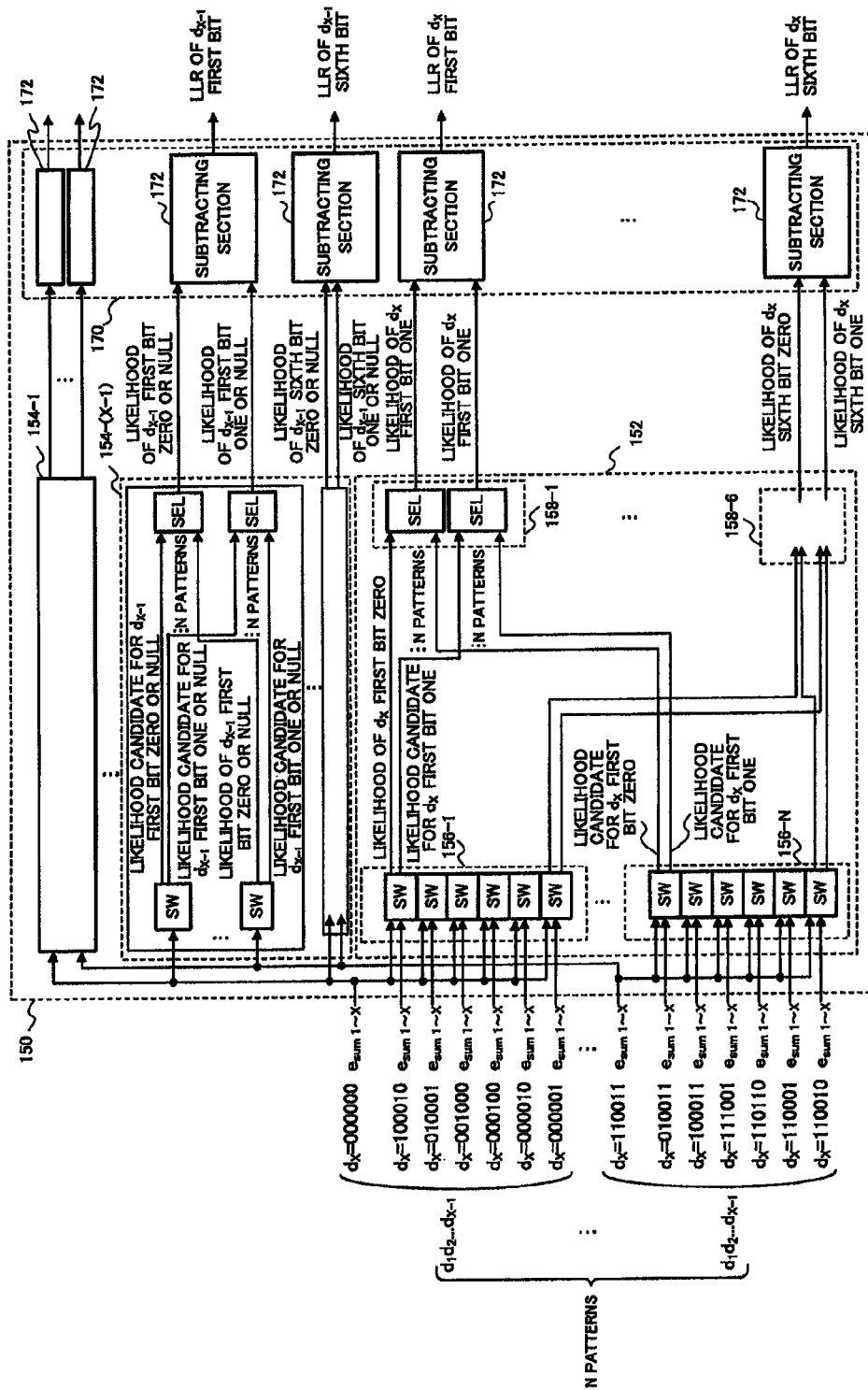
FIG. 6 shows a configuration of a likelihood outputting section of FIG. 2.

As shown in FIG. 6, likelihood outputting section 150 has: selecting section 152 that selects the likelihood of the transmission signal in the final stage based on the square Euclidean distances calculated in distance calculating section 140; selecting section 154 that associates the likelihood defined when the candidate points for the transmission signal in the final stage are the closest neighboring signal points (N points), with the bit value of each bit of transmission signal candidate points determined in the stages before the final stage; and LLR calculating section 170 that calculates LLR based on the bit likelihood of each transmission signal.

Selecting section 152 further has switching sections 156-1 to N and selecting sections 158-1 to 6 (the number of which corresponds to the M-ary modulation value). Switching sections 156 are provided in number N to equal the number of (N patterns) of combinations of symbol candidates of transmission signals up to the stage before the final stage, that is, in number N equivalent to the number of candidate point groups, are provided. Switching sections 156-1 to N receive as input the constituent signal points of the respective candidate point groups, and outputs the constituent signal points to selecting sections 158 associated with the bit focused upon when constituent signal points other than the closest signal point are selected, and outputs the closest neighboring signal point to all selecting sections 158.

Selecting sections 158 are provided in number to equal the M-ary modulation value. The bit to focus upon is set in advance, and so each selecting section 158 selects the input signal point of the shortest square Euclidean distance per bit value of the bit to focus upon, and outputs the selected input signal point, signal candidate points associated with the input signal point and determined by the final stage and the likelihoods of these input signal point and signal candidate points. Selecting section 158 has two selectors (SEL) associated with each bit value.

Selecting section 154 has selecting sections 154-1 to (X-1) associated with the first stage to the stage before the final stage. Further, selecting sections 154-1 to (X-1) are associated with stages before the final stage, and carries out processing of the likelihoods of transmission signals in stages before the final stage based on the square Euclidean distances calculated in distance calculating section 140, in the same manner as the selection in the final stage in above selecting section 152, and thereby selects the signal point of the shortest Euclidean distance in each class in which candidate signal points are classified per bit value of each focused bit, and outputs this selected signal point and the likelihood of this selected signal point.

Using outputs from selecting section 152 and selecting section 154, LLR calculating section 170 calculates LLR of each focused bit for the transmission signal of each stage based on the likelihood of the bit value 0 and the likelihood of the bit value 1 of each focused bit.

The operation of above selecting section 152 will be visually described with reference to FIG. 7.

Figure 7:
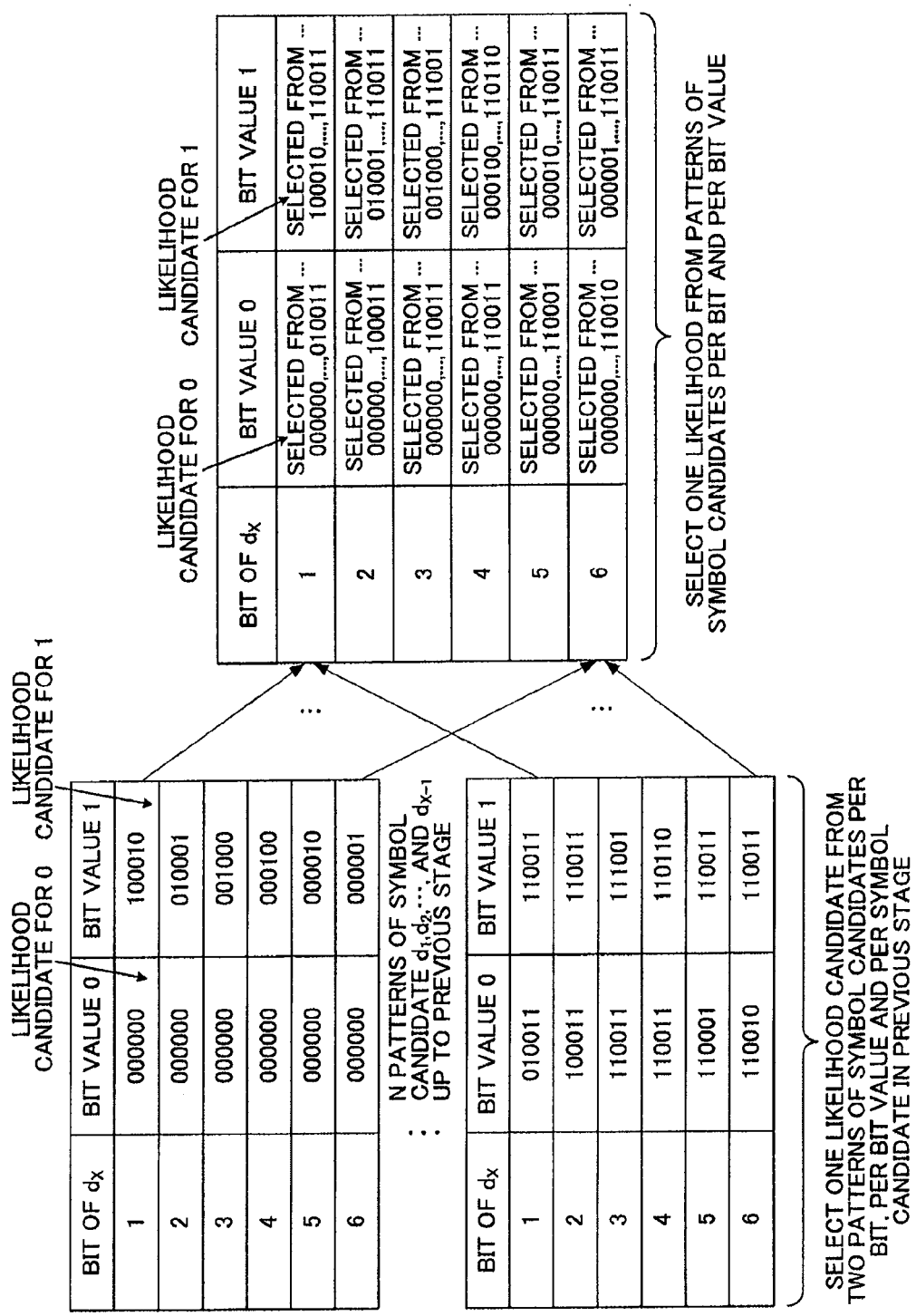
FIG. 7 illustrates the operation of the likelihood outputting section of FIG. 2.

N signal point groups, as shown in the left side of FIG. 7, are inputted to switching sections 156. Referring to the upper left signal point groups in FIG. 7, classification is performed per bit value of the bit (bit of dx in FIG. 7) to focus upon. That is, the closest neighboring signal point is classified as is per bit value of each focused bit. The rest of the constituent signal points are classified according to the bit focused upon when the constituent signal points are selected.

Switching sections 156 assign input constituent signal points to selecting sections 158 provided in association with focused bits, according to such classification.

The bits to focus upon are set in advance in selecting sections 158. That is, selecting sections 158 are prepared in association with the focused bits in the right figure of FIG. 7 (bit of dx in FIG. 7). Each selecting section 158 selects the input signal point of the shortest square Euclidean distance per bit value of the focused bit and outputs the selected input signal point, signal candidate points associated with this input signal point and determined before the final stage and the likelihoods of the input signal point and signal candidate points. That is, for example, selecting section 158-1 is set in advance to focus upon the first bit, and selects the input signal point of the shortest square Euclidean distance from "000000," to "010011" according to the bit value 0 of the focused bit, and outputs the selected input signal point, signal candidate points associated with the selected input signal point and determined before the final stage and the likelihoods of the input signal point and signal candidate points. Further, selecting section 158-1 selects the input signal point of the shortest square Euclidean distance from "100010" to "110011" according to the bit value 1 of the focused bit and outputs the selected input signal point, signal candidate points associated with the selected input signal point and determined before the final stage and the likelihoods of the input signal point and signal candidate points. By the way, the constituent signal points of a signal point group outputted from signal point candidate selecting section 130 and neighboring signal point candidate detecting section 120 efficiently include signal points showing "1" or signal points showing "0" for all bits of the transmission signal in the final stage. Consequently, even if likelihoods are narrowed down to one likelihood per bit value of each bit in selecting section 152, there is little influence upon the reliability of subsequent processings. On the other hand, the amount of subsequent processings can be reduced significantly as described above.

Figure 8:
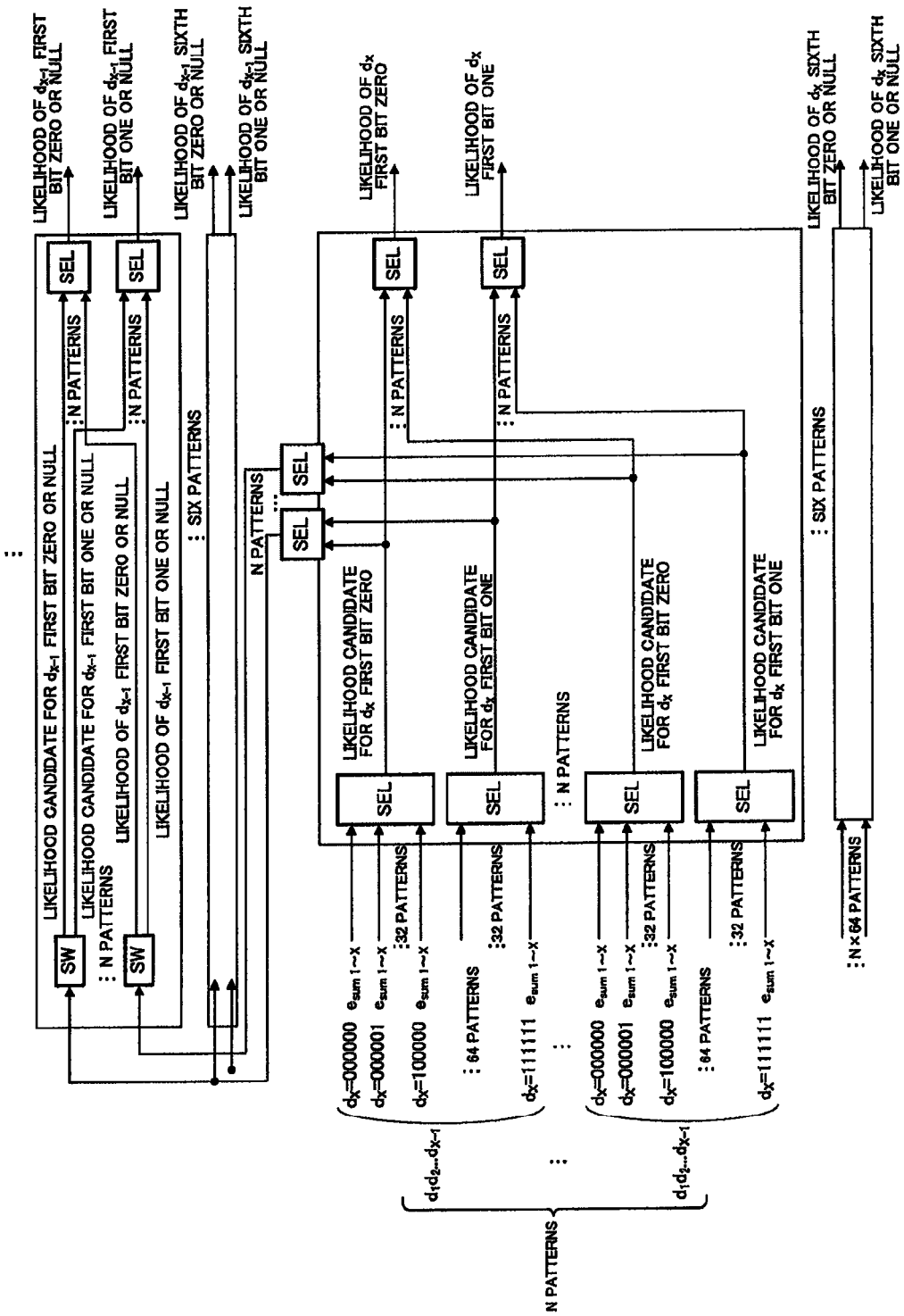
FIG. 8 shows a conventional configuration example to be compared with the likelihood outputting section of FIG. 6.

For reference, if 64 symbol candidates are provided in the final stage without narrowing down symbol candidates in the final stage as in the conventional QRM-MLD, to carry out the same processing as in the above likelihood outputting section, selecting section 152 and selecting section 154 would employ the configuration shown in FIG. 8. This configuration requires (24N-12)×X+361×N selectors. Compared to the configuration of likelihood outputting section 150 of the present embodiment, 361×N selectors are additionally required. Consequently, by employing the above configuration of maximum likelihood deciding section 100, the configuration and control can be simplified.

Although the outputs from stages before the final stage have not been particularly described above, the present invention is not particularly limited to this aspect, and QR-MLD, QRM-MLD or quadrant detection QRM-MLD may be employed.

According to Embodiment 1, the signal demultiplexing apparatus that is used in a radio receiving apparatus adopting a MIMO scheme and that carries out signal demultiplexing by a maximum likelihood detection scheme using QR decomposition, has: neighboring signal point detecting section 120 as a detecting means that detects, for every remaining combination of signal point candidates determined by one stage before a final stage, a closest neighboring signal point that is on a constellation used in the final stage and that is shortest separated distance from signal points defined when every combination is fixed (i.e., signal points defined when symbol candidates are fixed); signal point candidate selecting section 130 as a selecting means that selects the signal points on the constellation which are associated with the closest neighboring signal point and a number of which is a natural number equal to or less than an M-ary modulation value of a received signal; and distance calculating section 140 as a distance calculating means that calculates measures showing Euclidean distances (square Euclidean distances) between a received signal point in the final stage after unitary conversion, and the closest neighboring signal point and the selected signal points.

By so doing, the number of candidate points for every remaining combination of signal point candidates determined by the stage before the final stage can be decreased to m+1, so that it is possible to decrease the amount of operation and reduce power consumption.

Each signal point on the constellation associated with the closest neighboring signal point (that is, each signal point group outputted from signal point candidate selecting section 130 according to the closest neighboring signal point) is a signal point in which a bit value is inverted per focused bit to focus upon among bits of the closest neighboring signal point and closest to the closest neighboring signal point.

By so doing, the closest neighboring signal point in each combination and m signal points associated with the closest neighboring signal point include signal points showing "1" or signal point showing "0" for all bits of the transmission signal in the final stage as constituent signals, so that it is possible to lower the probability that there is no bit likelihood, and improve communication quality in a communication apparatus in which this signal demultiplexing apparatus is mounted.

Further, the signal demultiplexing apparatus has likelihood outputting section 150 as another selecting means that selects a signal point of a shortest Euclidean distance in each class in which the closest neighboring signal point in every combination and signal points associated with the closest neighboring signal point are classified per bit value of each focused bit.

By so doing, it is possible to lower the probability that there is no bit likelihood in the outputs from the signal demultiplexing apparatus, and keep the reliability of subsequent processings and reduce the amount of operation.

Further, a signal demultiplexing apparatus that is used in a radio receiving apparatus adopting a MIMO scheme having N transmitting antennas and M receiving antennas (with the present embodiment, N and M are four) and that carries out signal demultiplexing by a maximum likelihood detection scheme using QR decomposition, has: deciding section 160 that, in a triangular matrix obtained by QR decomposing a channel estimation matrix, outputs every combination equal to or less than a maximum number of combinations adopted by transmission signal candidates multiplied by matrix elements which do not include zero and which are included in a row including a matrix element including zero (with the present embodiment, a row other than the row in the final stage); neighboring signal point detecting section 120 that detects, for every combination, a closest neighboring signal point that minimizes a separated distance on a constellation between: a total sum of a product of: a matrix element included in a row in which the matrix element including zero is not included in the triangular matrix; and the transmission signal candidate; and a matrix element of a received signal vector after unitary conversion obtained after a conjugate transpose matrix of a unitary matrix is multiplied upon the received signal vector, the matrix element matching the total sum; distance calculating section 140 (to be more specific, square Euclidean distance calculating circuit 142-7) that calculates for every combination per bit value of each bit of transmission signal candidates other than the transmission signal candidate multiplied with the matrix element which does not include zero, a sum of: measures showing Euclidean distances between: a total sum of products of matrix elements which do not include zero and the transmission signal candidates; and the received signal after unitary conversion matching the total sum; and measures showing Euclidean distances between the closest neighboring signal point and the received signal after the unitary conversion associated with the closest neighboring signal point; and likelihood outputting section 150 (to be more specific, selecting section 152) that selects a signal point of a smallest sum calculated in distance calculating section 140 in each class in which the closest neighboring signal point in every combination is classified per bit value of each bit of transmission signal candidates multiplied with the matrix element which does not include zero.

Further, the signal demultiplexing apparatus has signal point selecting section 130 that, in the triangular matrix obtained by QR decomposing the channel estimation matrix, selects signal points on the constellation which are associated with the closest neighboring signal point and a number of which is a natural number equal to or less than an M-ary modulation number of a transmission signal, per bit value of each bit of transmission signal candidates multiplied with the matrix element which does not comprise zero, and distance calculating section 140 calculates for every combination a sum of: measures showing Euclidean distances between a total sum of the matrix element which does not include zero and the transmission signal candidate and a received signal after unitary conversion matching the total sum; and measures showing Euclidean distances between the closest neighboring signal point and the selected signal points and the received signal after the unitary conversion associated with the closest neighboring signal point and the selected signal points and the received signal; and likelihood outputting section 150 selects a signal point of the smallest sum calculated in distance calculating section 140 in each class in which the closest neighboring signal point in every combination and signal points associated with the closest signal point are classified per bit value of each bit.

Embodiment 2

Embodiment 2 is limited to QRM-MLD, which is MLD involving QR decomposition and which further uses M algorithm. In this case, sums of square Euclidean distances $e_{SUM1~X-1}$ up to the stage before the final stage are in order from the smallest sum, $e_{SUM1~X-1(1st\ rank)}$, $e_{SUM1~X-1(2nd\ rank)}$, $e_{SUM1~X-1(3rd\ rank)}$, ..., and $e_{SUM1~X-1(N-th\ rank)}$. The square Euclidean distances inputted from the deciding section one stage before the final stage are inputted, in the above order, to the deciding section in the final stage.

With the present embodiment, the amount of square Euclidean distance calculation in the final stage is reduced based on the following theory. For ease of description, an example of the M-ary modulation value, m=6, that is, 64 QAM, will be described.

Regarding the sums of the square Euclidean distances up to the stage before the final stage, focusing upon the k-th rank and (k+1)-th rank next to the k-th rank, the final sums $e_{SUM1~X}$ of square Euclidean distances are as follows.

$$e_{SUM1X} = e_{SUM1X-1(k-th\ rank)} + e_X$$

$$e'_{SUM1X} = e_{SUM1X-1((k+1)-th\ rank)} + e'_X$$

However, in case of 64 QAM, there are seven patterns of $e_X$'s and $e'_X$'s. Based on the pre-condition, $e_{SUM1X-1(k-th\ rank)} \leq e_{SUM1X-1((k+1)-th\ rank)}$. Further, given that square Euclidean distances assume values of zero or greater, if $e_{SUM1X} \leq e_{SUM1X-1((k+1)-th\ rank)}$ holds for each $e_X$, then $e_{SUM1X} \leq e'_{SUM1X}$ always holds.

In this case, the sum of square Euclidean distances in the final stage, which is based on the sums of the square Euclidean distances ranked (k+1)-th up to the stage before the final stage, needs not to be selected as likelihood candidates. Consequently, square Euclidean distance calculation is not necessary, so that it is possible to provide an effect of reducing power consumption. However, calculation is not necessary only for likelihood candidates in the final stage and, in stages other than the final stage, at least the square Euclidean distance of the closest neighboring signal point needs to be calculated to calculate likelihood candidates in a subsequent stage.

Figure 9:
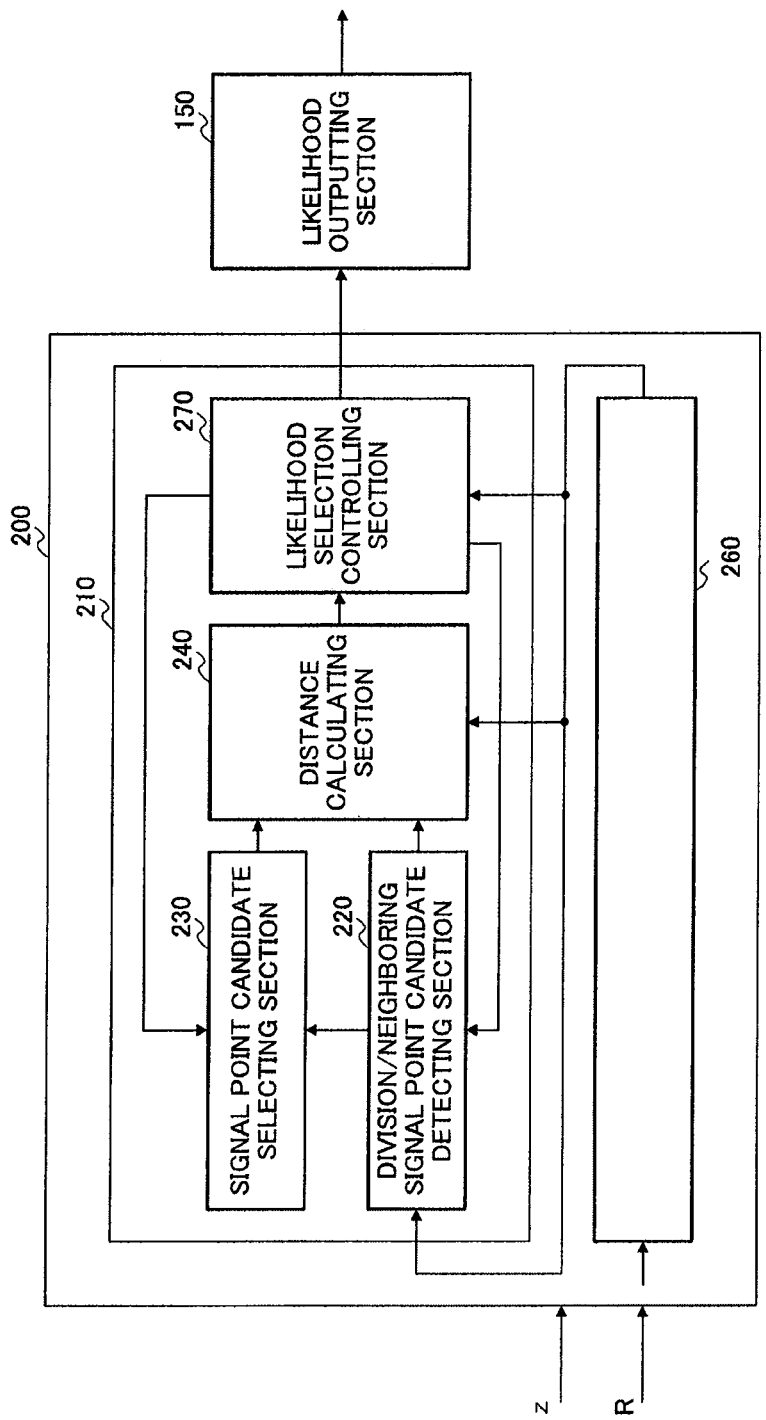
FIG. 9 is a block diagram showing a configuration of the maximum likelihood deciding section according to Embodiment 2.

As shown in FIG. 9, maximum likelihood deciding section 200 utilized in the signal demultiplexing apparatus mounted in a radio receiver has deciding section 210 that carries out processing in the final stage and deciding section 260 that carries out processing in the preceding stages. Further, deciding section 210 has division/neighboring signal point candidate detecting section 220, signal point candidate selecting section 230, distance calculating section 240 and likelihood selection controlling section 270.

Deciding section 260 ranks combinations of symbol candidates of transmission signals determined by a certain stage and the sum of square Euclidean distances in the combinations, in order from the smallest sum of the square Euclidean distances, and outputs the result to deciding section 210 (particularly, division/neighboring signal point candidate detecting section 220 and likelihood selection controlling section 270).

Division/neighboring signal point candidate detecting section 220 detects the closest neighboring signal point on the constellation to the "signal point defined when symbol candidates are fixed" and detects the division in which the "signal point defined when symbol candidates are fixed" is assigned placing the closest neighboring signal point in the center, for (N patterns) of combinations of symbol candidates of transmission signals inputted from deciding section 260, and, according to a command signal from likelihood selection controlling section 270, outputs the closest neighboring signal nal point related to combinations of symbol candidates of transmission signals and the detected division, sequentially, to signal point candidate selecting section 230 and distance calculating section 240, in order from the shortest square Euclidean distance.

According to the command signal from likelihood selection controlling section 270, signal point candidate selecting section 230 sequentially outputs signal points on the constellation associated with the closest neighboring signal point from division/neighboring signal point candidate detecting section 220 in order from the smallest square Euclidean distance, to distance calculating section 240. For example, signal point candidate selecting section 230 stores in advance signal points on the constellation used in the final stage and m signal points associated with the signal points. Further, signal point candidate selecting section 230 stores in advance the above m signal points ranked based on distances between divisions partitioned placing in the center the signal points on the constellation used in the final stage and m signal points associated with the above signal points. Consequently, signal point candidate selecting section 230 is configured to output not only all the outputs of m signal points in each combination, but also the outputs of only the signal points of specific ranks among m signal points in each combination, depending on the content of the command signal from likelihood selection controlling section 270. Further, the closest neighboring signal point and signal points, regardless of all or part of m signal points, from signal point candidate selecting section 230 are referred to as a "signal point group" similar to Embodiment 1.

Figure 10:
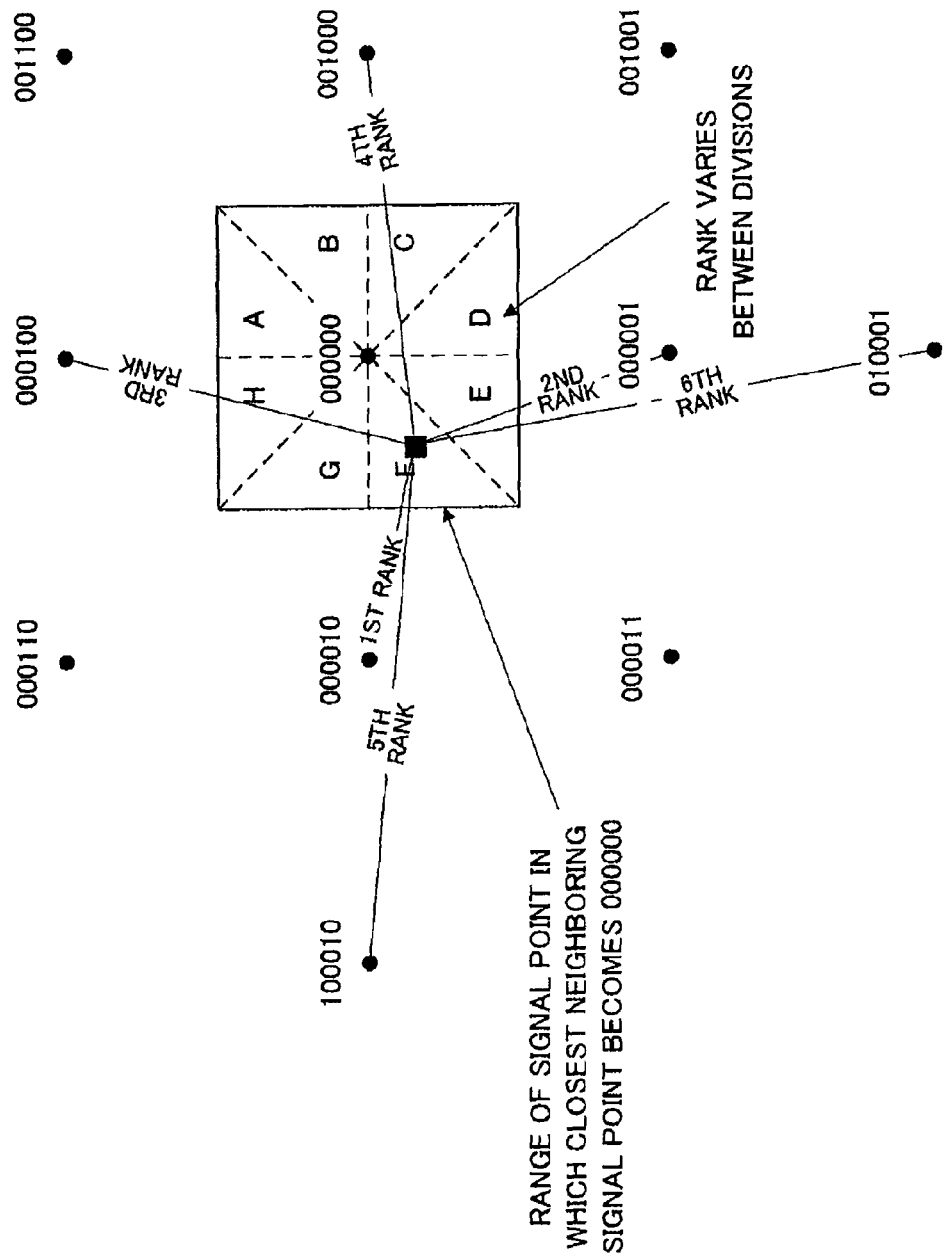
FIG. 10 illustrates a ranking method.

Here, the method of ranking m signal points will be described using FIG. 10. Inside the square frame of FIG. 10, the closest neighboring signal point is "000000." The area (the above square frame) placing the closest neighboring signal point in the center is further divided, so that the distances to m signal points can be ranked based on the divided areas. That is, if the divided area in which "the signal point defined when symbol candidates are fixed" is located can be detected, the distances to m signal points are uniquely determined and therefore can be ranked.

Distance calculating section 240 calculates square Euclidean distances between the received signal in the final stage after unitary conversion, and the closest neighboring signal point from division/neighboring signal point candidate detecting section 220 and signal points from signal point candidate selecting section 230, and outputs the calculation result to likelihood selection controlling section 270.

Likelihood selection controlling section 270 compares: the final sum of the square Euclidean distances ($e_{SUM1\sim X}$ in the above description) of a certain signal point group received from distance calculating section 240 and held; and the sum of the square Euclidean distances ($e_{SUM1\sim X-1((k+1)\text{-}th\ rank)}$ in the above description) in each combination up to the previous stage which is one rank lower (that is, one rank higher where sums of square Euclidean distances are aligned from the smallest order) than combinations of transmission signals up to the previous stage of this certain signal group.

As a result of comparison, if $e_{SUM1X}$ are equal to or less than $e_{SUM1X-1((k+1)\text{-}th\ rank)}$, likelihood selection controlling section 270 outputs the signal point group of $e_{SUM1X}$ and the final square Euclidean distances per constituent signal point of this signal point group. On the other hand, if $e_{SUM1\sim X}$ are greater than $e_{SUM1\sim X-1((k+1)\text{-}th\ rank)}$, likelihood selection controlling section 270 holds the final sum of the square Euclidean distances of the signal point group of $e_{SUM1\sim 1((k+1)\text{-}th\ rank)}$, and outputs a command signal for commanding signal point candidate selecting section 230 and division/neighboring signal point candidate detecting section 220 to output the signal point group in the combination of transmission signals in which the sum of the square Euclidean distances up to the previous stage is ranked next. By the way, likelihood selection controlling section 270 compares: the final sum of m+1 square Euclidean distances of a certain signal group; and the sum of m+1 square Euclidean distances up to the previous stage in the combination which is one rank lower (that is, one rank higher when the sums of the square Euclidean distances are aligned from the smallest order) than the combination of transmission signals up to the previous stage of the certain signal point, according to the ranking with respect to the distances from the detected division in signal point candidate selecting section 230. Therefore, the command signal for signal point candidate selecting section 230 may include commands for outputting signal points matching the focused bit and the bit value of the focused bit of a constituent signal point in which $e_{SUM1\sim X}$ have become greater than $e_{SUM1\sim X-1((k+1)\text{-}th\ rank)}$ as a result of comparison. Further, likelihood selection controlling section 270 outputs a command signal to signal point candidate selecting section 230 and division/neighboring signal point candidate detecting section 220 to, first, control the output of the signal group ranked first at the timing at which combinations of symbol candidates of transmission signals and the sums of square Euclidean distances in the combinations are inputted from the previous stage.

Figure 11:
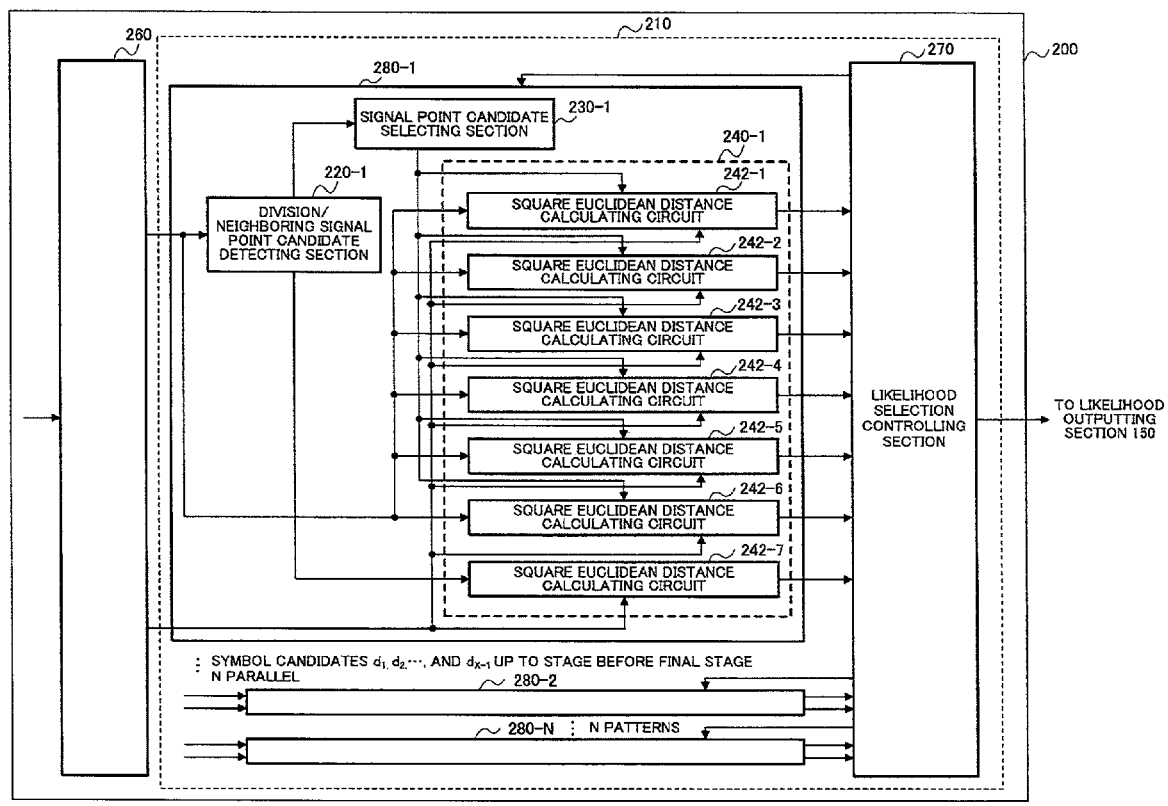
FIG. 11 shows a detailed configuration where an M-ary modulation value 6, that is, 64 QAM modulation scheme, is adopted in the deciding section of FIG. 9.

FIG. 11 shows the detailed configuration of deciding section 210 particularly in the case where the M-ary modulation value 6, that is, 64 QAM modulation, scheme is adopted. Function sections (division/neighboring signal point candidate detecting section 220, signal point candidate selecting section 230 and distance calculating section 240), provided in deciding section 210, are provided in square Euclidean distance calculation processing sections 280-1 to N associated with (N patterns) of combinations of symbol candidates of transmission signals up to the stage before the final stage. Distance calculating sections 240 each have seven square Euclidean distance calculation circuits 242.

First, likelihood selection controlling section 270 outputs a command signal to signal point candidate selecting section 230 and division/neighboring signal point candidate detecting section 220 of square Euclidean distance processing section 280-1 to, first, control the output of the signal group ranked first at the timing at which combinations of symbol candidates of transmission signals and the sums of the square Euclidean distances in the combinations are inputted from the previous stage. Further, the final square Euclidean distances according to the command signal is inputted.

Then, likelihood selection controlling section 270 outputs the command signal to square Euclidean distance calculation processing section 280-2 to control the output of the signal point group ranked second. Likelihood selection controlling section 270 thus outputs output command signals to subsequent square Euclidean distance calculation processing section 280 until $e_{SUM1\sim X} \leq e_{SUM1\sim X-1((k+1)\text{-}th\ rank)}$ is satisfied.

Next, the operation of maximum likelihood deciding section 200 having the above configuration, particularly, the operation of likelihood selection controlling section 270 of deciding section 210 in the case where 64 QAM is adopted as the modulation scheme, will be described with reference to FIG. 12.

Figure 12:
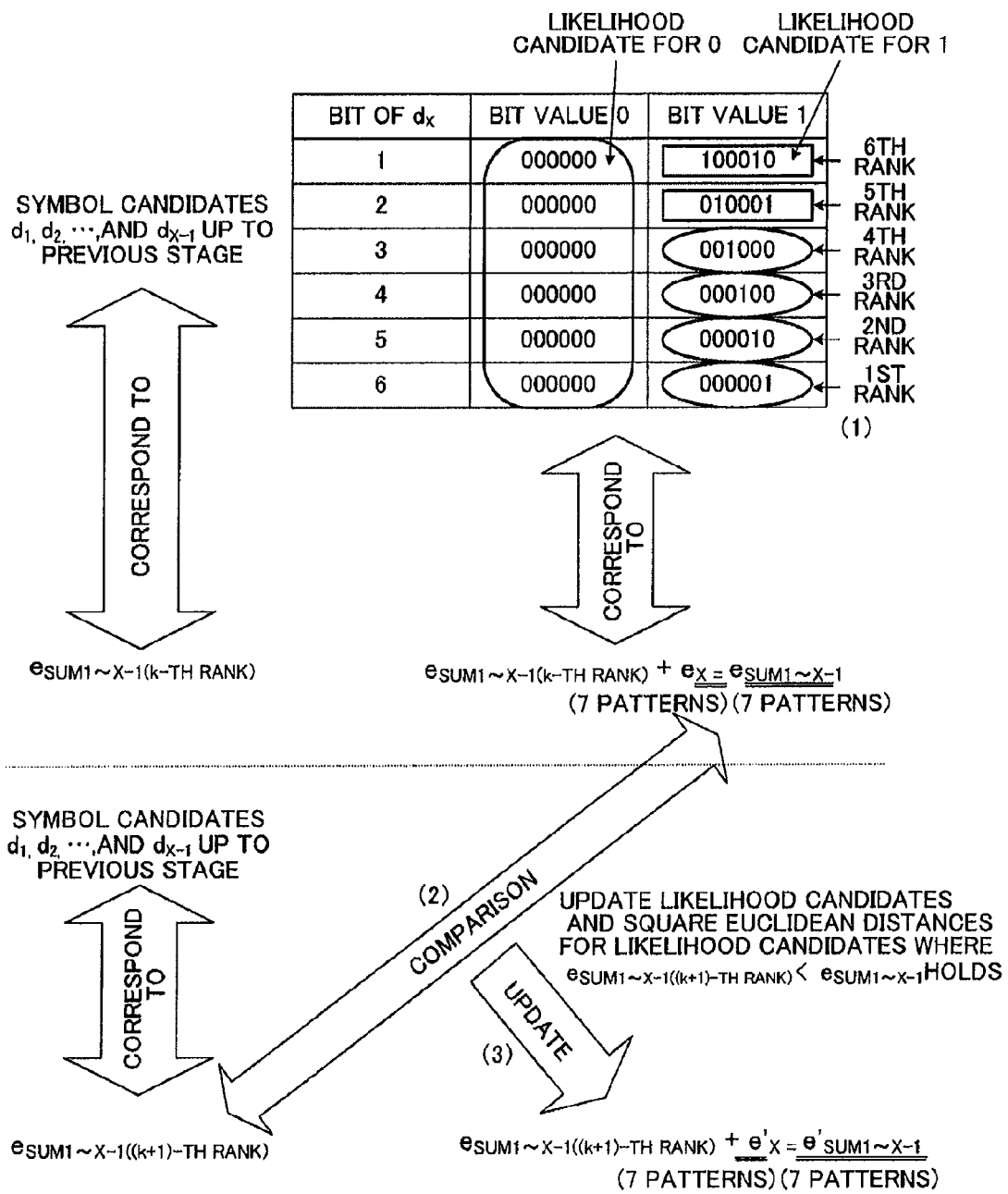
FIG. 12 illustrates an operation of the maximum likelihood deciding section of FIG. 9.

In the upper part of FIG. 12, constituent signal points of a signal group in combinations of transmission signals ($d_1$ $d_2$, ..., and $d_{X-1}$) having the sums of square Euclidean distances ranked k-th up to the stage before the final stage, are classified per focused bit, and signal points other than the closest neighboring signal point are further ranked based on the separated distance from the detected division ((1) in FIG. 12). In FIG. 12, it is obvious that the square Euclidean distance to the closest neighboring signal point is ranked first, and so the other constituent signal points other than the closest neighboring signal point are ranked. Likelihood selection controlling section 270 acquires the final sums of square Euclidean distances $e_{SUM1\sim X}$ (7 patterns) of these constituent signal points of the signal point group.

Next, likelihood selection controlling section 270 compares these final sums of square Euclidean distances $e_{SUM1\sim X}$ (7 patterns) and the sums of square Euclidean distances $e_{SUM1\sim X\text{-}1((k+1)\text{-}th\ rank)}$ up to the stage before the final stage in combinations of transmission signals $(d'_1 d'_2 \ldots d'_{X-1})$ up to the previous stage in which the sum of square Euclidean distances is ranked (k+1)-th ((2) in FIG. 12).

Then, as a result of comparison, if $e_{SUM1\sim X}$ are equal to or less than $e_{SUM1\sim X\text{-}1((k+1)\text{-}th\ rank)}$, the signal point group of $e_{SUM1\sim X}$ and the final square Euclidean distances of the constituent signal points of this signal point group are inputted to likelihood outputting section 150. On the other hand, if $e_{SUM1\sim X}$ are greater than $e_{SUM1\sim X\text{-}1((k+1)\text{-}th\ rank)}$, likelihood selection controlling section 270 holds (updates) the final sum of the square Euclidean distances of the signal group of $e_{SUM1\sim X\text{-}1((k+1)\text{-}th\ rank)}$, and outputs a command signal for commanding signal point candidate selecting section 230 and division/neighboring signal point candidate detecting section 220 to output a signal point group in combinations of transmission signals up to the previous stage in which the sum of square Euclidean distances is ranked next (see (3) in FIG. 12).

By the way, if $e_{SUM1\sim X}$ become greater than $e_{SUM1\sim X\text{-}1((k+1)\text{-}th\ rank)}$ of only constituent signal points (ranked fifth and sixth) of a signal point group surrounded by a square as shown in the upper part in FIG. 12, output command signals for constituent signal points are outputted to signal point candidate selecting section 230, according to the focused bits and the bit values of the focused bits of the constituent signal points ranked fifth and sixth (in FIG. 12, the focused bit is the second bit and its bit value is "1" in "010001" and the focused bit is the first bit and its bit value is "1" in "100010").

That is, in (2) of FIG. 12, the sums of square Euclidean distances $e_{SUM1\sim X\text{-}1((k+1)\text{-}th\ rank)}$ of symbol candidates $d'_1$ $d'_2, \ldots,$ and $d'_{X-1}$ up to the previous stage and the sum of square Euclidean distances of ranked likelihood candidates, are compared. Then, in (3) of FIG. 12, with respect to likelihood candidates where $e_{SUM1\sim X\text{-}1((k+1)\text{-}th\ rank)} < e_{SUM1\sim X}$ holds, the likelihood candidates and the sums of square Euclidean distances $e'_{SUM1\sim X}$ are updated. For example, in the comparison of (2) of FIG. 12, comparison is drawn sequentially from the first rank in the table in the upper part of FIG. 12, and, if $e_{SUM1\sim X\text{-}1((k+1)\text{-}th\ rank)} < e_{SUM1\sim X}$ holds in the fifth rank or sixth rank, the sum of square Euclidean distances of likelihood candidates for the bit value 1 of the first and second bits of the symbol candidates in the final stage is compared with $e'_{SUM1\sim X}$ of likelihood candidates of the bit value 1 of the first and second bits, and the smaller sum is updated as new square Euclidean distances. Further, if the same processing is repeated the next time, comparison needs not to be drawn again sequentially from the first rank and only the fifth rank and sixth rank need to be compared. If updating does not take place by the sixth rank, $e_{SUM1\sim X\text{-}1(k\text{-}th\ rank)} \leq e_{SUM1\sim X\text{-}1((k+1)\text{-}th\ rank)}$ (k=1 to N−1) holds, and so updating does not take place thereafter. Consequently, after the sixth rank, square Euclidean distance calculation is not necessary. However, as described above, calculation is not necessary only for likelihood candidates in the final stage, and at least the square Euclidean distance of the closest neighboring signal point needs to be calculated to calculate likelihood candidates in stages other than the final stage.

Figure 13:
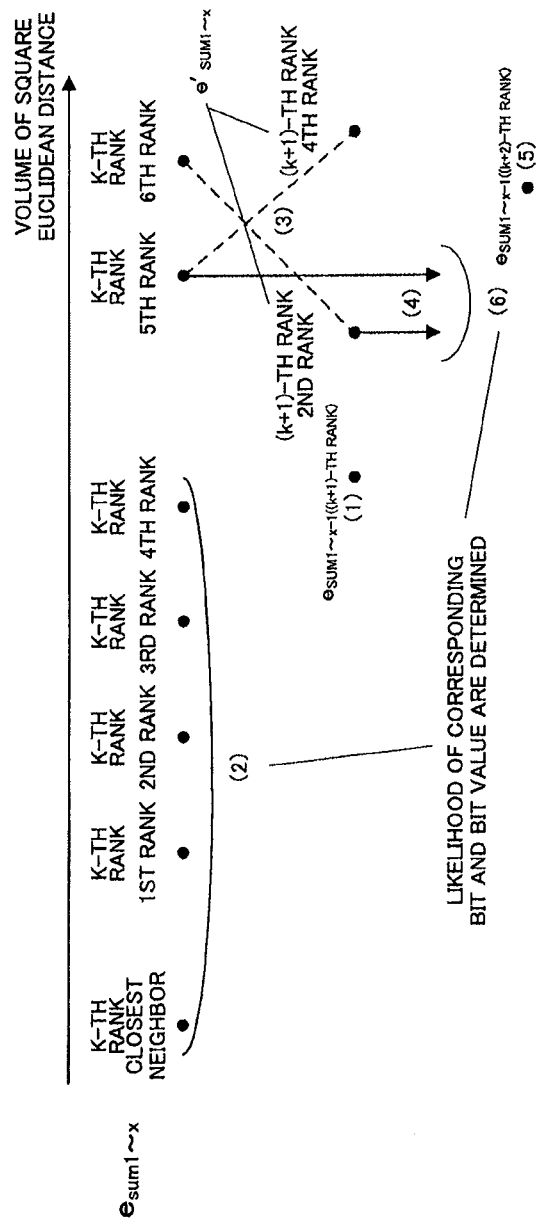
FIG. 13 illustrates an operation of the maximum likelihood deciding section of FIG. 9.

The above description will be described in more detail with reference to FIG. 13. First, the sum of square Euclidean distances $e_{SUM1\sim X}$ (the closest neighbor) of the closest neighboring signal point ranked k-th and $e_{SUM1\sim X}$ ranked first to sixth rank of m signal points associated with the closest neighboring signal point ranked k-th are compared with the sum of square Euclidean distances of the closest neighboring signal point ranked (k+1)-th ((1) of FIG. 12). Second, when $e_{SUM1\sim X\text{-}1((k+1)\text{-}th\ rank)}$ is between the fourth rank and fifth rank in k ranks, the closest neighboring signal point ranked k-th and likelihoods of focused bits ranked first to fourth in the k ranks and the bit values of the focused bits, are determined ((2) in FIG. 12). Third, in what ranks the bits and the bit values of the bits ranked fifth and sixth in k ranks correspond to in the k+1 ranks, is learned. For example, assume that the fifth rank in the k ranks corresponds to the fourth rank in the (k+1) ranks and the sixth rank in the k ranks corresponds to the second rank in the (k+1) ranks ((3) in FIG. 12). Fourth, these are compared and the smaller sum of square Euclidean distances is used as the likelihood candidates of the focused bits and bit values ((4) in FIG. 12). Likelihoods of these bits and bit values are unfixed. Fifth, the volume of $e_{SUM1\sim X\text{-}1((k+2)\text{-}th\ rank)}$ is compared with the second rank in the k+1 ranks and the fifth rank in the k ranks ((5) in FIG. 12). Sixth, when $e_{SUM1\sim X\text{-}1((k+2)\text{-}th\ rank)}$ is greater than the fifth rank in the k ranks, the likelihoods of the bits and bit values corresponding to the second rank in the k+1 ranks and the fifth rank in the k ranks are fixed to the values of the sums of square Euclidean distances held as $e_{SUM1\sim X\text{-}1((k+2)\text{-}th\ rank)}$. At this point, likelihoods are fixed for all bits and bit values ((6) in FIG. 12). Then, square Euclidean distance calculation is not necessary afterward (other than the closest neighboring signal point).

According to Embodiment 2, the signal demultiplexing apparatus that is used in a radio receiving apparatus adopting a MIMO scheme and that carries out signal demultiplexing by a maximum likelihood detection scheme using QR decomposition, has: division/neighboring signal point detecting section 220 as a detecting means that detects, for every remaining combination of signal point candidates determined by one stage before a final stage, a closest neighboring signal point that is on a constellation used in the final stage and that is shortest separated distance from signal points defined when every combination is fixed; signal point candidate selecting section 230 as a selecting means that selects the signal points on the constellation which are associated with the closest neighboring signal point and a number of which is a natural number equal to or less than an M-ary modulation value of a received signal; distance calculating section 240 as a distance calculating means that calculates measures showing Euclidean distances between a received signal point in the final stage after unitary conversion, and the closest neighboring signal point and the selected signal points; and likelihood selection controlling section 270 as another selecting section that: makes the detecting section and the selecting section sequentially output the closest neighboring signal point and the signal points associated with the closest neighboring signal point in order from a smallest Euclidean distance between signal point candidates in every combination and the received signal point in each stage after unitary conversion; stops an output when a measure showing a final Euclidean distance in a current combination is equal to or less than measures which are one rank higher than the current combination and which show Euclidean distances up to the stage before the final stage; and selects the closest neighboring signal point in the current combination and signal points associated with the closest neighboring signal point.

By so doing, when the measure showing the final square Euclidean distance in the current combination is equal to or less than the measures showing the Euclidean distances up to the stage before the final stage which is one rank higher than the current combination, the outputs from the detecting means and the selecting means can be stopped, so that it is possible to reduce the amount of operation of distance calculating section 240 subsequent to the both means.

Embodiment 3

Embodiment 3 is directed to reducing the amount of calculation of square Euclidean distances using the same theory as in Embodiment 2. However, with Embodiment 3, the signal point candidate selecting section stores signal points on the constellation used in the final stage and m signal points associated with the signal points, and further stores in association with the above m signal points the tentative distances representing the distances of the above m signal points to the closest neighboring signal point in distance unit by using the shortest distance between adjacent signal points on the above constellation as distance unit 1. In "comparison" in the likelihood selection controlling section, a predetermined distance matching the tentative distance is used.

Figure 14:
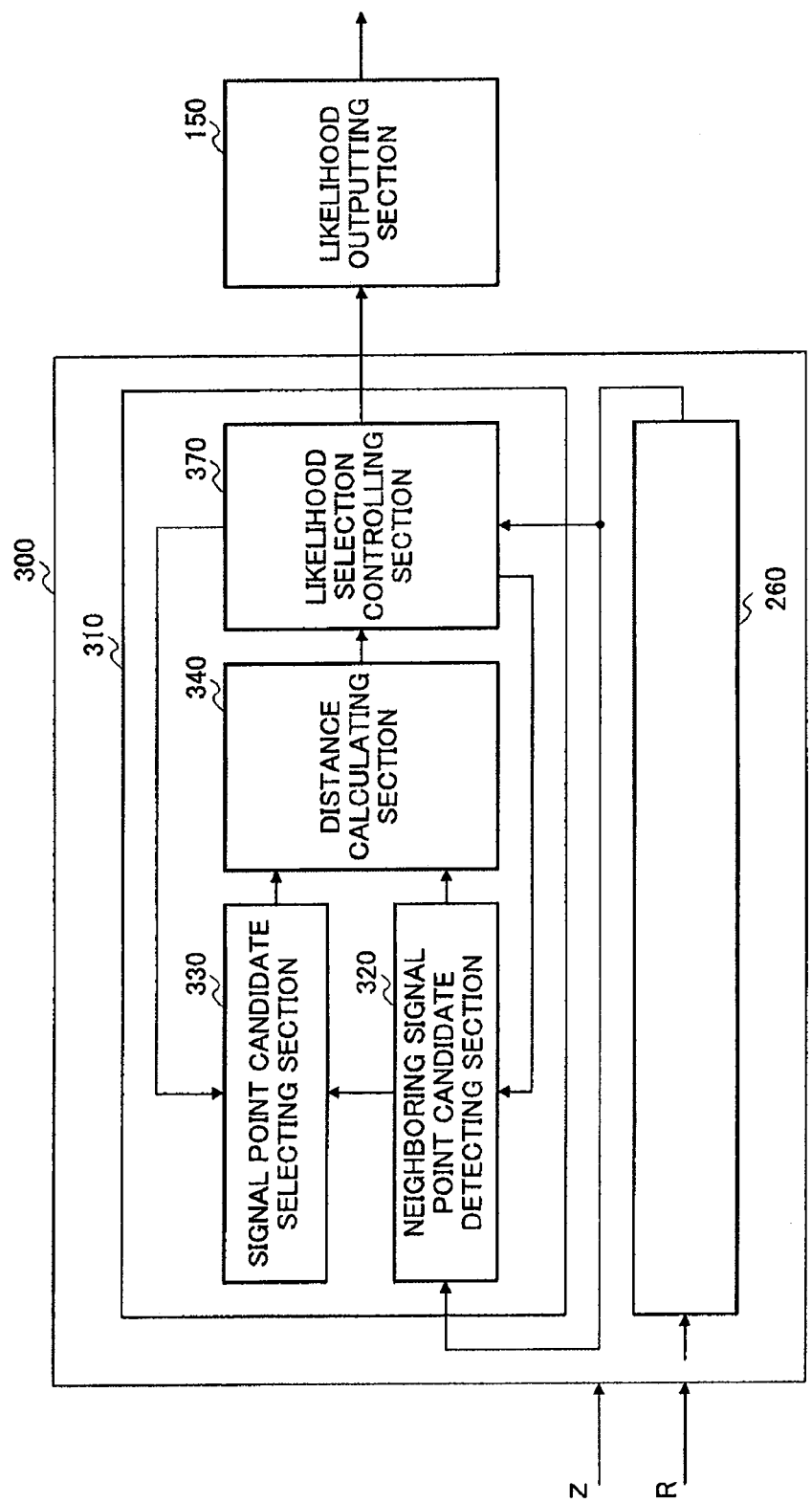
FIG. 14 is a block diagram showing a configuration of the maximum likelihood deciding section according to Embodiment 3.

As shown in FIG. 14, maximum likelihood deciding section 300 of Embodiment 3 utilized in the signal demultiplexing apparatus mounted in the radio receiver has deciding section 310 carrying out processing in the final stage. This deciding section 310 has neighboring signal point candidate detecting section 320, signal point candidate selecting section 330, distance calculating section 340 and likelihood selection controlling section 370.

Deciding section 260 ranks combinations of symbol candidates of transmission signals determined by an applicable stage and sums of square Euclidean distances in the combinations in order from the smallest sum of square Euclidean distances, and outputs the result to deciding section 310 (particularly, neighboring signal point candidate detecting section 320 and likelihood selection controlling section 370).

Neighboring signal point candidate detecting section 320 detects the closest neighboring signal point on the constellation to the "signal point defined when symbol candidates are fixed," for (N patterns) of combinations of symbol candidates of transmission signals inputted from deciding section 260, and sequentially outputs the closest neighboring signal point related to combinations of symbol candidates of transmission signals, to signal point candidate selecting section 330 and distance calculating section 340, according to the command signal, from likelihood selection controlling section 370.

According to the command signal from likelihood selection controlling section 370, signal point candidate selecting section 330 outputs signal points on the constellation associated with the closest neighboring signal point from neighboring signal point candidate detecting section 320 and "tentative distances" of the signal points, sequentially to distance calculating section 340 in order from the shortest square Euclidean distance up to the previous stage. For example, signal point candidate selecting section 330 stores in advance signal points on the constellation used in the final stage and m signal points associated with the signal points, and further stores in advance the m signal points ranked based on the "tentative distances" between the signal points on the constellation used in the final stage and the m signal points associated with the signal points. Consequently, signal point candidate selecting section 330 is configured to output not only all the outputs of m signal points in each combination but also the outputs of only signal points of specific ranks among m signal points in each combination according to the content of the command signal from likelihood selection controlling section 370. Further, a group of the closest neighboring signal point and signal points, regardless of all or part of m signal points, from signal point candidate selecting section 330 are referred to as the "signal point group" similar to Embodiment 1.

Figure 15:
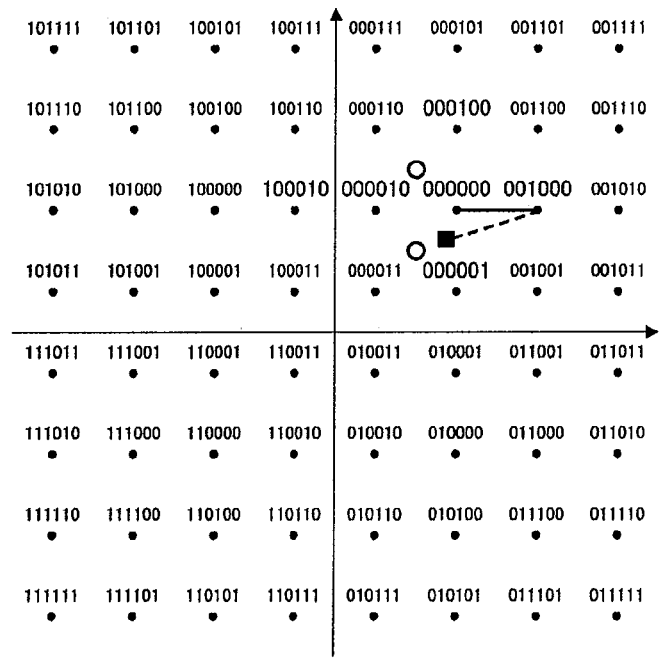
FIG. 15 illustrates "maximum separatable distance"

Here, referring to FIG. 15, "m signal points and their tentative distances" will be described. In FIG. 15, the "signal point defined when symbol candidates are fixed" represented by the symbol ■ is shown first, and its closest neighboring signal point is "000000." Further, the closest m signal points among signal points in which each bit of the closest neighboring signal point is inverted, to be more specific, "100010," "010001," "001000," "000100," "000010" and "000001," are associated with "000000." Furthermore, the distances (i.e., tentative distances) from the m signal points to the closest neighboring signal point are associated by using the shortest distance (the solid line in FIG. 15) between adjacent signals on the constellation as distance unit 1. That is, "001000," "000100," "000010" and "000001" are associated with tentative distance 1, and "100010" and "010001" are associated with tentative distance 2.

Distance calculating section 340 calculates square Euclidean distances between the received signal in the final stage after unitary conversion, and the closest neighboring signal point from neighboring signal point candidate detecting section 320 and signal points from signal point candidate selecting section 330, and outputs the calculation result to likelihood selection controlling section 370. Further, the tentative distances associated with the m signal points are outputted with the calculation result to likelihood selection controlling section 370.

Likelihood selection controlling section 370 compares the "maximum separatable distances" that can be adopted between the constituent signals and the "signal point defined when symbol candidates are fixed," which is determined from tentative distances associated with constituent signal points of a certain signal point group received from distance calculating section 340 and held, with the sums of square Euclidean distances ($e_{SUM1 \sim X-1((k+1)\text{-}th\ rank)}$ in the above description) up to the stage before the final stage in combinations which are one rank lower (that is, one rank higher where the sums of square Euclidean distances are aligned from the smallest order) than combinations of transmission signals up to the stage before the final stage of the certain signal point group.

When the results of comparison, the "maximum separatable distances," are equal to lower than $e_{SUM1 \sim X-1((k+1)\text{-}th\ rank)}$, likelihood selection controlling section 370 outputs constituent signal points resulting from the "maximum separatable distances" and final square Euclidean distances of these constituent signal points, to likelihood outputting section 150. On the other hand, when the "maximum separatable distances" are greater than $e_{SUM1 \sim X-1((k+1)\text{-}th\ rank)}$, likelihood selection controlling section 370 holds the final sum of the square Euclidean distances of the signal point group of $e_{SUM1 \sim X-1((k+1)\text{-}th\ rank)}$, and outputs a command signal for commanding signal point candidate selecting section 330 and neighboring signal point candidate detecting section 320 to output a signal point group in the combination of transmission signals up to the stage before the final stage in which the sum of square Euclidean distances is ranked next. By the way, likelihood selection controlling section 370 compares: m+1 "maximum separatable distances" of a certain signal point group; and the sum of m+1 square Euclidean distances of the certain signal point group up to the previous stage in combinations which are one rank lower (that is, one rank higher where the sums of square Euclidean distances are aligned from the smallest order) than combinations of transmission signals up to the previous stage according to "tentative distances." Therefore, the command signal for signal point candidate selecting section 330 may include a command for outputting only signal points matching the focused bit and bit value of the focused bit of a constituent signal point in which the "maximum separatable distance" becomes greater than $e_{SUM1 \sim X-1((k+1)\text{-}th\ rank)}$ as a result of comparison. Further, likelihood selection controlling section 370 outputs a command signal to signal point candidate selecting section 330 and neighboring signal point candidate detecting section 320 to, first, control the output of the signal point group ranked first at the timing at which combinations of symbol candidates of transmission signals and the sums of square Euclidean distances in the combinations are inputted from the previous stage.

Here, the above "maximum separatable distance" will be described with reference to FIG. 15. As shown in FIG. 15, when the closest neighboring signal point is "000000," the "maximum separatable distance" between a constituent signal when the tentative distance from this closest neighboring signal point is 1 (for example, "0010000" in FIG. 15) and the "signal point defined when symbol candidates are fixed" assume a case where the "signal point defined when symbol candidates are fixed" is at the position represented by "o" in FIG. 15 and is $\sqrt{(1.5^2+0.5^2)}=\sqrt{(2.5)}$ when the distance between adjacent signal points is 1. By the way, in the same manner, when the tentative distance is two, the "maximum separatable distance" is $\sqrt{(2.5^2+0.5^2)}=\sqrt{(6.5)}$.

Figure 16:
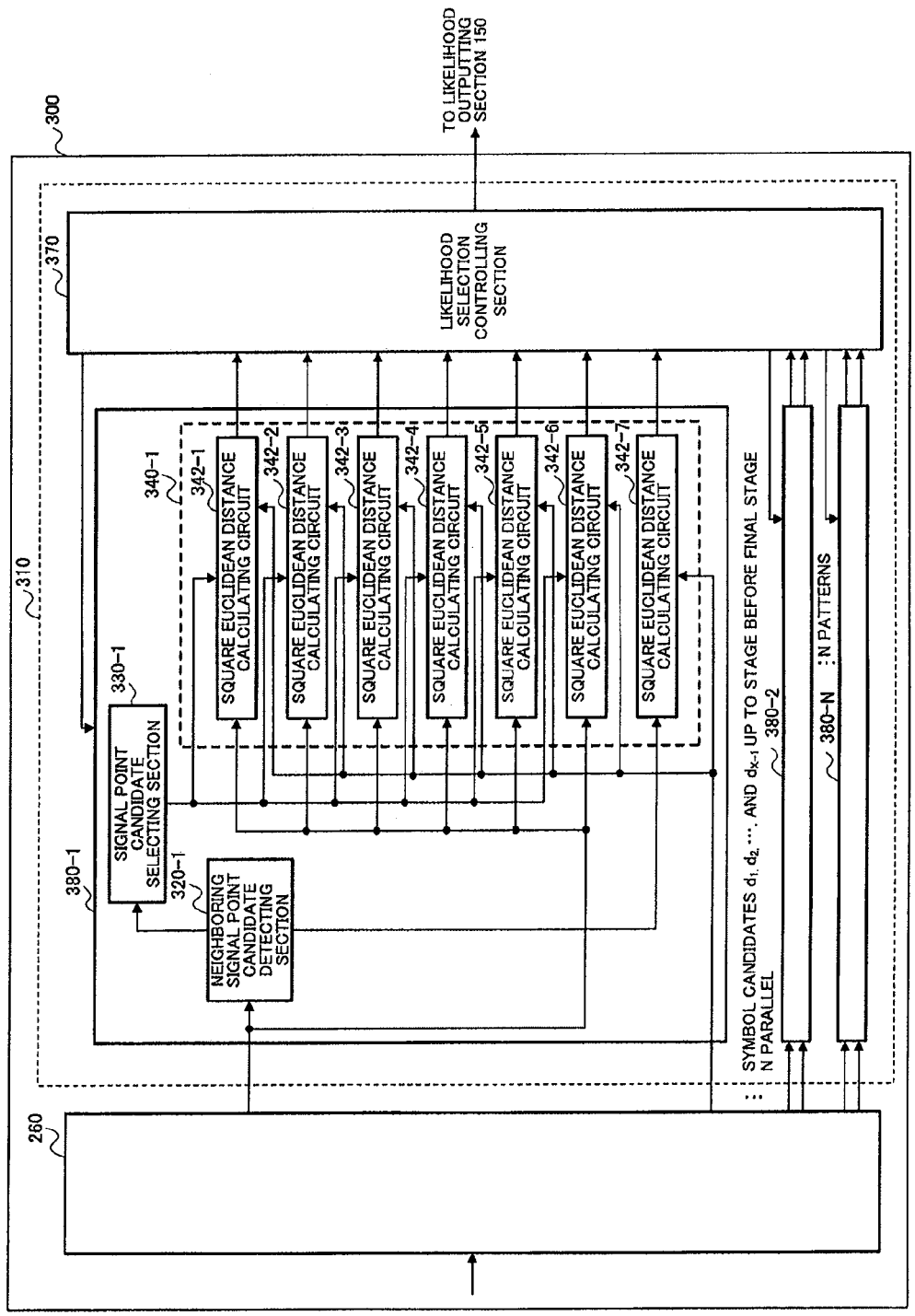
FIG. 16 shows a detailed configuration where an M-ary modulation value 6, that is, 64 QAM modulation scheme, is adopted in the deciding section of FIG. 14.

FIG. 16 shows the detailed configuration of deciding section 310, particularly in a case where the M-ary modulation value 6, that is, 64 QAM modulation scheme, is adopted. Function sections (neighboring signal point candidate detecting section 320, signal point candidate selecting section 330 and distance calculating section 340) provided in deciding section 310 are provided in square Euclidean distance calculation processing sections 380-1 to N associated with (N patterns) of combinations of symbol candidates of transmission signals up to the stage before the final stage. Distance calculating sections 340 each have seven square Euclidean distance calculation circuits 342.

First, likelihood selection controlling section 370 outputs a command signal to signal point candidate selecting section 330 and neighboring signal point candidate detecting section 320 of square Euclidean distance processing section 380-1 to, first, control the output of the signal group ranked first at the timing at which combinations of symbol candidates of transmission signals and the sums of the Euclidean distances in the combinations are inputted from the previous stage. Further, the final square Euclidean distance is inputted according to the command signal.

Then, likelihood selection controlling section 370 outputs the command signal to square Euclidean distance calculation processing section 380-2 to control an output of a signal point group ranked second. Likelihood selection controlling section 370 thus outputs output command signals to subsequent square Euclidean distance calculation processing section 380 until the "maximum separatable distance"$\leqq$ $e_{SUM1 \sim X-1((k+1)\text{-}th\ rank)}$ is satisfied.

Next, the operation of maximum likelihood deciding section 300 having the above configuration, particularly, the operation of likelihood selection controlling section 370 of deciding section 310 in the case where 64 QAM is adopted as the modulation scheme, will be described with reference to FIG. 17.

Figure 17:
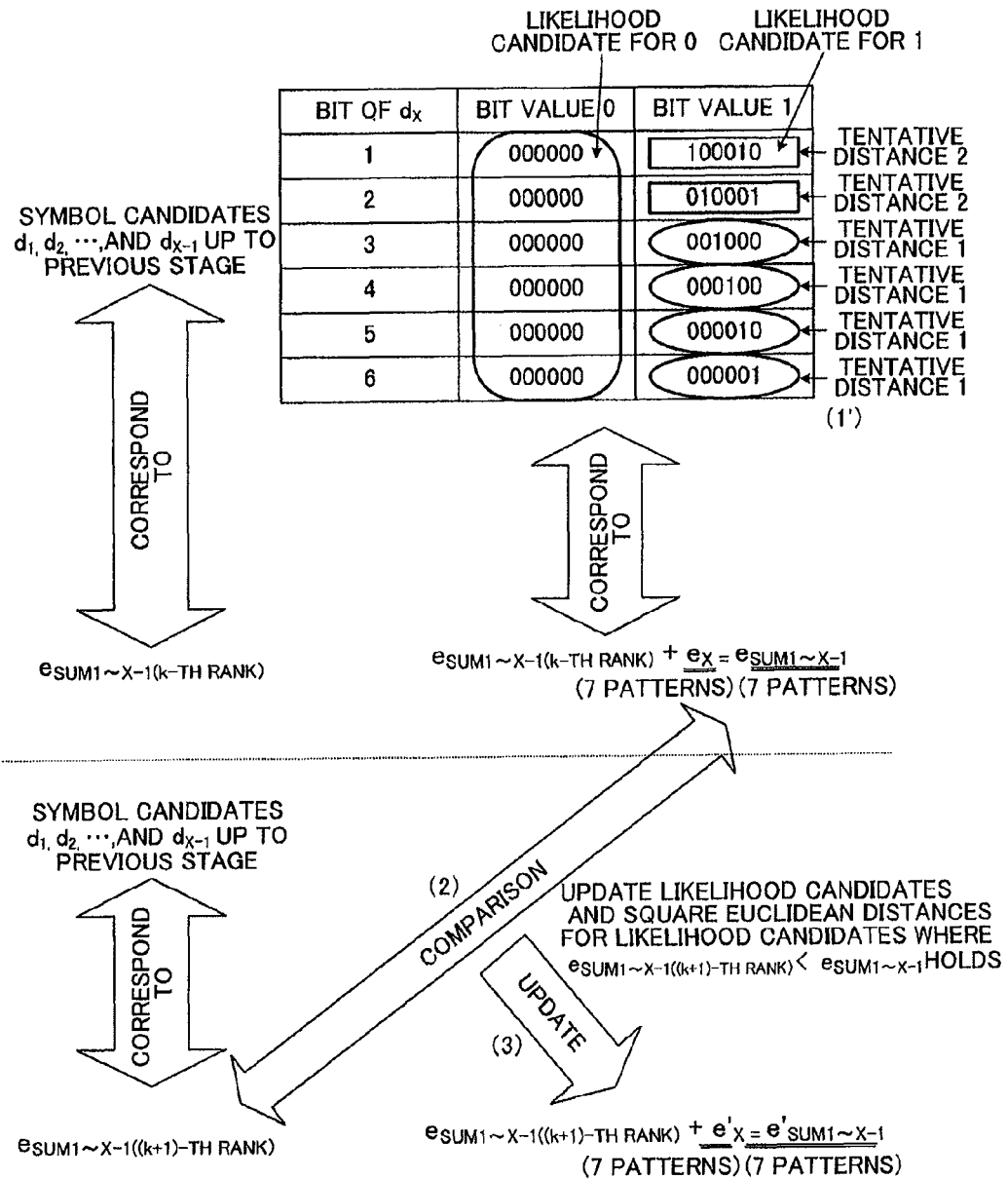
FIG. 17 illustrates the operation of the maximum likelihood deciding section of FIG. 14.

In the upper part of FIG. 17, constituent signal points of a signal group in combinations of transmission signals ($d_1$ $d_2$, . . . , and $d_{X-1}$) having the sum of square Euclidean distances ranked k-th up to the stage before the final stage, are classified per focused bit, and signal points other than the closest neighboring signal point are associated with the tentative distances from the closest neighboring signal point ((1') in FIG. 17). Likelihood selection controlling section 370 acquires the "maximum separatable distances" (7 patterns) that can be adopted between these constituent signal points of a signal point group and "the signal point defined when symbol candidates are fixed."

Next, likelihood selection controlling section 370 compares these "maximum separatable distances" (7 patterns) and the sums of square Euclidean distances $e_{SUM1 \sim X-1((k+1)\text{-}th\ rank)}$ up to the previous stage in combinations of transmission signals ($d'_1 d'_2$, . . . , and $d'_{X-1}$) having the sum of square Euclidean distances ranked k+1-th next ((2) in FIG. 17).

Then, if the "maximum separatable distances" are equal to or less than $e_{SUM1 \sim X-1((k+1)\text{-}th\ rank)}$ as a result of comparison, constituent signal points resulting from the "maximum separatable distances" and final square Euclidean distances of these constituent signal points, are outputted to likelihood outputting section 150. On the other hand, if the "maximum separatable distances" are greater than $e_{SUM1 \sim X-1((k+1)\text{-}th\ rank)}$, likelihood selection controlling section 370 holds (updates) the final sum of the square Euclidean distances of a signal group of $e_{SUM1 \sim X-1((k+1)\text{-}th\ rank)}$, and outputs a command signal for commanding signal point candidate selecting section 330 and neighboring signal point candidate detecting section 320 to output a signal point group in the combination of transmission signals in which the sum of square Euclidean distances up to the stage before the final stage is ranked next.

According to Embodiment 3, the signal demultiplexing apparatus that is used in a radio receiving apparatus adopting a MIMO scheme and that carries out signal demultiplexing by a maximum likelihood detection scheme using QR decomposition, has: neighboring signal point detecting section 320 as a detecting means that detects, for every remaining combination of signal point candidates determined by one stage before a final stage, a closest neighboring signal point that is on a constellation used in the final stage and that is shortest separated distance from signal points defined when every combination is fixed; signal point candidate selecting section 330 as a selecting means that selects the signal points on the constellation which are associated with the closest neighboring signal point and a number of which is a natural number equal to or less than an M-ary modulation value of a received signal; distance calculating section 340 as a distance calculating means that calculates measures showing Euclidean distances between a received signal point in the final stage after unitary conversion, and the closest neighboring signal point and the selected signal points; and likelihood selection controlling section 370 as another selecting section that: makes the detecting section and the selecting section sequentially output the closest neighboring signal point and the signal points associated with the closest neighboring signal point in order from a smallest Euclidean distance between signal point candidates in every combination and the received signal point in each stage after unitary conversion; stops an output when a measure showing a final Euclidean distance in a current combination is equal to or less than measures which are one rank higher than the current combination and which show Euclidean distances up to the stage before the final stage; and selects the closest neighboring signal point in the current combination and signal points associated with the closest neighboring signal point.

By so doing, when the measure showing the final square Euclidean distance in the current combination is equal to or less than the measures showing Euclidean distances up to the stage before the final stage which are one rank higher than the current combination, the outputs from the detecting means and the selecting means can be stopped, so that it is possible to reduce the amount of operation of distance calculating section 340 subsequent to the both means.

Other Embodiments

With Embodiment 1, a memory that stores symbol candidates associated with the closest neighboring signal point has been described as an example of signal point candidate selecting section 130. However, depending on the circuit configuration, it is also possible to find applicable symbol candidates from the closest neighboring signal point each time. Note that the gray encoded constellation is a precondition. Further, although the coordinates of signal points on the constellation adopt ±r11, ±3r11, ±5r11 and ±7r11, particularly when 64 QAM modulation scheme is adopted, the present invention is not limited to this. Hereinafter, referring to FIG. 18, this will be described in detail.

Figure 18:
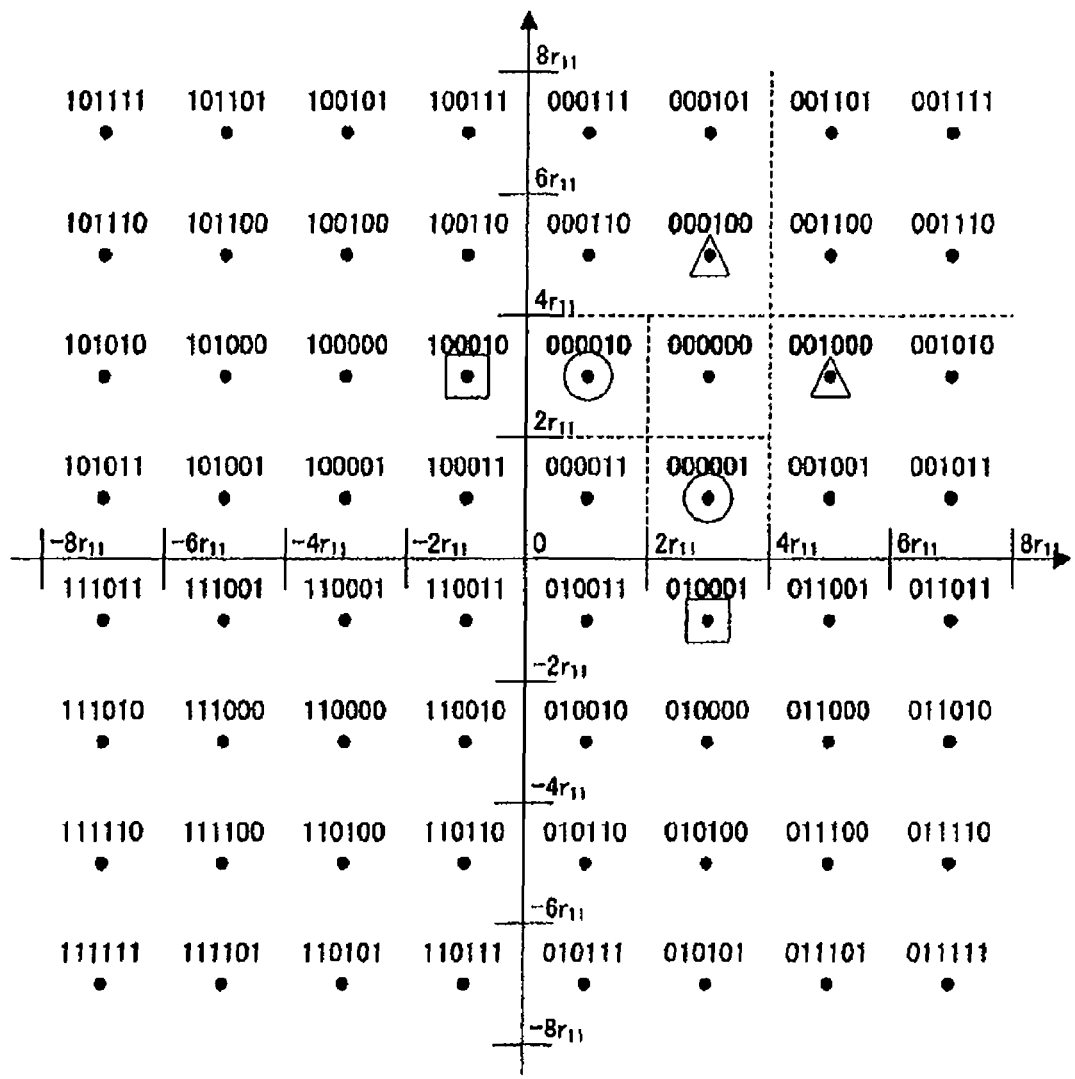
FIG. 18 illustrates a method of selecting signal points associated with the closest neighboring signal point according to other embodiments.

First, the x coordinate of the closest neighboring signal point "000000" is compared with "0" and the signal point in which the first bit is inverted and which is required in likelihood calculation is detected based on the comparison result (with respect to the closest neighboring signal point, the opposite signal point across the x coordinate "0," that is, the signal point, "100010," surrounded by the square in FIG. 18, is detected). The second bit is compared with the y coordinate "0" and is processed likewise (with respect to the closest neighboring signal point, the opposite signal point across the y coordinate "0," that is, the signal point, "100010," surrounded by the square in FIG. 18, is detected).

Next, given that the result of comparison with the x coordinate "0" is learned, the closest neighboring signal point is then compared with the x coordinate 4r11 or −4r11, and the signal point in which the third bit is inverted and which is required in likelihood calculation, that is, "0010000" surrounded by the triangle in FIG. 18, is detected based on the comparison result (if the x coordinate of the closest neighboring signal point is greater than "0," the opposite signal point across the x coordinate 4r11 is detected. If smaller, the opposite signal point across the x coordinate −4r11 is detected.). With respect to the fourth bit, by carrying out the same processing in comparison with the y coordinate, the point surrounded by the triangle in FIG. 18, that is, "000100," is detected.

Given that the result of comparison with the x coordinate 4r11 or −4r11 is learned, the closest neighboring signal point is then compared with the x coordinate 2r11, 6r11, −2r11 and −6r11, and the signal point in which the fifth bit is inverted and which is required in likelihood calculation, that is, "000010" encircled in FIG. 18, is detected based on the comparison result (if the x coordinate of the closest neighboring signal point is greater than 4r11, the opposite signal point across 6r11 is detected. If the x coordinate of the closest neighboring signal point is greater than "0" and is smaller than 4r11, the opposite signal point across 2r11 is detected. If the x coordinate of the closest neighboring signal point is greater than −4r11 and is smaller than "0," the opposite signal point across −2r11 is detected. If the x coordinate of the closest neighboring signal point is smaller than −4r11, the opposite signal point across −6r11 is detected.). With respect to the sixth bit, by carrying out the same processing in comparison with the y coordinate, the signal point encircled in FIG. 18, that is, "000001," is detected.

Embodiments of the present invention have been described.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration. Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible. Further, if the integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-225933, filed on Aug. 22, 2006, including the specification, drawings and abstract, is incorporated herein by reference in its entirety.

INDUSTRIAL APPLICABILITY

The signal demultiplexing apparatus and signal demultiplexing method according to the present invention provides advantages of reducing the amount of operation and improving communication quality, and are suitable for use particularly in a radio receiving apparatus that carries out MIMO communication.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A signal demultiplexing method for determining a likelihood of each bit included in a second signal, which is spatially multiplexed with and received with a first signal, based on a maximum likelihood detection (MLD) method using QR decomposition, the first signal excluding the second signal to be calculated only in a final stage of the MLD method, the signal demultiplexing method comprising:

for each of a plurality of signal point candidates of the first signal, detecting a closest neighboring signal point to thereby obtain a plurality of closest neighboring signal points, wherein each of the signal point candidates of the first signal is determined by one stage before the final stage, and each of the closest neighboring signal points is a point that is on a constellation of points in a signal space of the second signal and that has a smallest distance from a signal point calculated based on each of the signal point candidates of the first signal, respectively;

for each of the plurality of closest neighboring signal points, identifying a plurality of bit-inversed points that are each closest to the closest neighboring signal point within a corresponding group of bit-inversed points, wherein plural groups of bit-inversed points respectively include signal points on the constellation of points that have one of plural bits in the closest neighboring signal inversed;

calculating a first distance from each of unitary-converted received signal points, to each of the plurality of signal point candidates of the first signal and to each of the plurality of neighboring signal points, to thereby obtain a plurality of first distances;

calculating a second distance from each of the unitary-converted received signal points to each of the plurality of bit-inversed points that are closest to each of the closest neighboring signal points, to thereby obtain a plurality of second distances; and determining a likelihood of each bit included in the second signal by identifying a corresponding smallest value among both the calculated plurality of first distances and the calculated plurality of second distances, wherein, the identifying step identifies the plurality of bit-inversed points based on stored information, which defines correspondence between each of signal points on the constellation of points and a plurality of bit-inversed points that are each closest to each of the signal points within a corresponding second group of bit-inversed points, wherein plural second groups of bit-inversed points respectively include signal points on the constellation of points that have one of plural bits, in each of the signal points, inversed.

2. The signal demultiplexing method of claim 1, wherein signal points are mapped on the signal space by Gray coded mapping.

3. A signal demultiplexing apparatus for determining a likelihood of each bit included in a second signal, which is spatially multiplexed with and received with a first signal, based on a maximum likelihood detection (MLD) method using QR decomposition, the first signal excluding the second signal to be calculated only in a final stage of the MLD method, the signal demultiplexing apparatus comprising:

a detector detecting, for each of a plurality of signal point candidates of the first signal, a closest neighboring signal point to thereby obtain a plurality of closes neighboring signal points, wherein each of the signal point candidates of the first signal is determined by one stage before the final stage, and each of the closest neighboring signal points is on a constellation of points in a signal space of the second signal and that has a smallest distance from a signal point calculated based on each of the signal point candidates of the first signal, respectively;

a selector identifying, for each of the plurality of closest neighboring signal points, a plurality of bit-inversed points that are each closest to the closest neighboring signal point within a corresponding group of bit-inversed points, wherein plural groups of bit-inversed points respectively include signal points on the constellation of points that have one of plural bits in the closest neighboring signal inversed;

a calculator calculating a first distance from each of unitary-converted received signal points, to each of the plurality of signal point candidates of the first signal and to each of the plurality of neighboring signal points, to thereby obtain a plurality of first distances, and calculating a second distance from each of the unitary-converted received signal points to each of the plurality of bit-inversed points that are closest to each of the closest neighboring signal points, to thereby obtain a plurality of second distances; and a determinator determining a likelihood of each bit included in the second signal by identifying a corresponding smallest value among both the calculated plurality of first distances and the calculated plurality of second distances, wherein, the selector identifies the plurality of bit-inversed points based on stored information, which defines correspondence between each of signal points on the constellation of points and a plurality of bit-inversed points that are each closest to each of the signal points within a corresponding second group of bit-inversed points, wherein plural second groups of bit-inversed points respectively include signal points on the constellation of points that have one of plural bits, in each of the signal points, inversed.

4. The signal demultiplexing apparatus of claim 3, wherein signal points are mapped on the signal space by Gray coded mapping.

* * * * *